(12) United States Patent
Okai et al.

(10) Patent No.: US 12,378,673 B2
(45) Date of Patent: Aug. 5, 2025

(54) SURFACE-TREATED STEEL SHEET FOR ORGANIC RESIN COATING AND METHOD OF PRODUCING SAME, AND ORGANIC RESIN COATED STEEL SHEET AND METHOD OF PRODUCING SAME

(71) Applicant: JFE STEEL CORPORATION, Tokyo (JP)

(72) Inventors: Kazuhisa Okai, Tokyo (JP); Rie Kaneko, Tokyo (JP); Reona Endo, Tokyo (JP); Fuyuko Ikeda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 66 days.

(21) Appl. No.: 18/245,346

(22) PCT Filed: Oct. 1, 2021

(86) PCT No.: PCT/JP2021/036533
§ 371 (c)(1),
(2) Date: Mar. 15, 2023

(87) PCT Pub. No.: WO2022/075235
PCT Pub. Date: Apr. 14, 2022

(65) Prior Publication Data
US 2023/0332295 A1    Oct. 19, 2023

(30) Foreign Application Priority Data
Oct. 5, 2020   (JP) ................................. 2020-168765

(51) Int. Cl.
| | |
|---|---|
| C23C 22/44 | (2006.01) |
| B32B 15/082 | (2006.01) |
| B32B 15/085 | (2006.01) |
| B32B 15/09 | (2006.01) |
| C23C 2/06 | (2006.01) |
| C23C 2/26 | (2006.01) |

(52) U.S. Cl.
CPC ............ C23C 22/44 (2013.01); B32B 15/082 (2013.01); B32B 15/085 (2013.01); B32B 15/09 (2013.01); C23C 2/06 (2013.01); C23C 2/26 (2013.01)

(58) Field of Classification Search
CPC .................................................... C23C 22/44
See application file for complete search history.

(56) References Cited

U.S. PATENT DOCUMENTS

| | | | | |
|---|---|---|---|---|
| 4,171,231 A | * | 10/1979 | Bishop | C23C 22/34 148/266 |
| 2004/0167266 A1 | * | 8/2004 | Hasegawa | C23C 22/44 524/413 |
| 2013/0171468 A1 | * | 7/2013 | Imokawa | C08G 18/0814 428/626 |
| 2013/0273389 A1 | | 10/2013 | Kaneko et al. | |
| 2017/0051413 A1 | * | 2/2017 | Marmann | C23C 22/82 |

FOREIGN PATENT DOCUMENTS

| | | |
|---|---|---|
| CN | 1174900 A | 3/1998 |
| CN | 103119200 A | 5/2013 |
| EP | 2540865 A1 | 1/2013 |
| EP | 2620524 A1 | 7/2013 |
| EP | 2540865 B1 | 11/2017 |
| JP | 2004002958 A | 1/2004 |
| JP | 2008291350 A | 12/2008 |
| JP | 2011219832 A | 11/2011 |
| JP | 2012067369 A | 4/2012 |
| JP | 2012072476 A | 4/2012 |
| WO | 2011052520 A1 | 5/2011 |

OTHER PUBLICATIONS

Nov. 16, 2021, International Search Report issued in the International Patent Application No. PCT/JP2021/036533.
Feb. 8, 2024, the Extended European Search Report issued by the European Patent Office in the corresponding European Patent Application No. 21877534.4.
Mar. 18, 2025, Office Action issued by the China National Intellectual Property Administration in the corresponding Chinese Patent Application No. 202180067736.9 with English language search report.

* cited by examiner

Primary Examiner — Scott W Dodds
(74) Attorney, Agent, or Firm — KENJA IP LAW PC

(57) ABSTRACT

Disclosed is a method of producing a surface-treated steel sheet for organic resin coating comprising: applying, to a surface of a zinc or zinc alloy coated or plated steel sheet, a surface-treatment solution containing a resin compound having a specific bisphenol skeleton, a cationic urethane resin emulsion, a silane coupling agent having a specific reactive functional group, an organic titanium chelate compound, a tetravalent vanadium compound, a molybdate compound, a fluorine compound, and water in a specific ratio and with a pH of 4 to 5 to form a surface-treatment layer such that a coating weight of the surface-treatment layer per surface after drying of the surface-treatment solution is 0.005 $g/m^2$ to 1.8 $g/m^2$.

9 Claims, No Drawings

SURFACE-TREATED STEEL SHEET FOR ORGANIC RESIN COATING AND METHOD OF PRODUCING SAME, AND ORGANIC RESIN COATED STEEL SHEET AND METHOD OF PRODUCING SAME

TECHNICAL FIELD

This disclosure relates to a surface-treated steel sheet for organic resin coating and a method of producing the same, and to an organic resin coated steel sheet and a method of producing the same.

BACKGROUND

Zinc or zinc alloy coated or plated steel sheets are widely used in the fields of automobiles, home appliances, and construction materials. Zinc or zinc alloy coated or plated steel sheets that are surface-treated by chromating using a treatment solution mainly composed of chromic acid, dichromic acid, or salts thereof to improve the corrosion resistance have conventionally been in wide use.

However, recent global environmental issues have increased the demand for the use of zinc or zinc alloy coated or plated steel sheets subjected to chromate-free surface treatment (hereinafter referred to as "chromate-free treated steel sheets"). Various chromate-free treated steel sheets have been developed and put into practical use.

Considering that chromate-free treated steel sheets are used in various applications such as automobiles, home appliances, and construction materials, they are required to have not only excellent corrosion resistance but also excellent blackening resistance and storage stability of the surface-treatment solution used.

JP 2012-67369 A (PTL 1) describes a method of manufacturing a surface-treated steel sheet comprising the steps of: applying, to surfaces of a zinc or zinc alloy coated or plated steel sheet, a surface-treatment solution containing a resin compound having a specific bisphenol skeleton, a cationic urethane resin emulsion, a silane coupling agent having a specific reactive functional group, an organic titanium chelate compound, a tetravalent vanadium compound, a molybdate compound, a fluorine compound, and water in a specific ratio and with a pH of 4 to 5 to form a surface-treatment layer such that a coating weight per surface after drying is 0.2 g/m² to 1.8 g/m².

CITATION LIST

Patent Literature

PTL 1: JP 2012-67369 A

SUMMARY

Technical Problem

The method of manufacturing a surface-treated steel sheet described in PTL 1 is preferable in that it can produce a surface-treated steel sheet with excellent corrosion resistance and blackening resistance, as well as excellent storage stability of the surface-treatment solution used. However, PTL 1 does not consider: (i) the corrosion resistance of a surface-treated steel sheet when an organic resin layer of 60 μm or more in thickness or an organic resin layer with small elongation is formed on the surface-treated steel sheet; and (ii) the adhesion between an organic resin layer and a surface-treatment layer and the adhesion between the surface-treatment layer and a coated or plated layer when the surface-treated steel sheet is subjected to processing under a severe condition after the formation of the organic resin layer thereon. As one of the main purposes of forming an organic resin layer on a surface-treated steel sheet is to ensure surface quality and durability, it is effective to appropriately control the layer thickness. An appropriate layer thickness depends on the type of organic resin layer and the environment in which it is used, but is often 60 μm or more. The present inventors examined the method of manufacturing a surface-treated steel sheet described in PTL 1 and found that there is room for improvement with respect to items (i) and (ii) above.

It would thus be helpful to provide a method of producing a surface-treated steel sheet for organic resin coating, making it possible to produce a surface-treated steel sheet that has a surface-treatment layer free from chromium compounds, that is excellent not only in blackening resistance but also in (i) corrosion resistance when an organic resin layer of 60 μm or more in thickness or an organic resin layer with small elongation is formed on a surface-treated steel sheet, and (ii) adhesion between the organic resin layer and the surface-treated layer and adhesion between the surface-treated layer and the coated or plated layer when the surface-treated steel sheet is subjected to processing under a severe condition after formation of the organic resin layer thereon, and that is excellent in storage stability of the surface-treatment solution used.

Solution to Problem

As a result of our intensive studies, it was discovered that the properties set forth in the aforementioned items (i) and (ii) can be improved and the above issues can be resolved by a combination of the following:

(A) using a surface-treatment solution that contains a resin compound having a specific bisphenol skeleton, a cationic urethane resin emulsion, a silane coupling agent having a specific reactive functional group, an organic titanium chelate compound, a tetravalent vanadium compound, a molybdate compound, a fluorine compound, and water in a specific ratio and that has a pH of 4 to 5, where the content of the fluorine compound, among others, is intentionally increased in the specific ratio; and (B) applying the surface-treatment solution to a surface of a zinc or zinc alloy coated or plated steel sheet to form a surface-treatment layer such that a coating weight of the surface-treatment layer per surface is as small as 0.005 g/m² to 0.18 g/m² after drying of the surface-treatment solution.

The present disclosure is based on these discoveries, and primary features thereof are as follows.

[1] A method of producing a surface-treated steel sheet for organic resin coating, the method comprising:
applying, to a surface of a zinc or zinc alloy coated or plated steel sheet, a surface-treatment solution containing:
a resin compound (A) having a bisphenol skeleton represented by general formula (I) below;
a cationic urethane resin emulsion (B) having at least one cationic functional group selected from the group consisting of primary to tertiary amino groups and a quaternary ammonium base;
a silane coupling agent (C) having at least one reactive functional group selected from the group consisting of an active hydrogen-containing amino group, an epoxy group, a mercapto group, and a methacryloxy group;
an organic titanium chelate compound (D);
a tetravalent vanadium compound (E);
a molybdate compound (F);
a fluorine compound (G); and
water (H), within a range satisfying conditions (1) to (6) below and with a pH of 4 to 5 to form a surface-treatment layer such that a coating weight of 15 the surface-treatment layer per surface is 0.005 g/m² to 0.18 g/m² after drying of the surface-treatment solution, (1) a ratio of a solid mass ($B_S$) of the cationic urethane resin emulsion (B) to a total of a solid mass ($A_S$) of the resin compound (A), the solid mass ($B_S$) of the cationic urethane resin emulsion (B), and a solid mass ($C_S$) of the silane coupling agent (C), represented by $[(B_S)/\{(A_S)+(B_S)+(C_S)\}]$, is from 0.10 to 0.30, (2) a ratio of the solid mass ($C_S$) of the silane coupling agent (C) to a total of the solid mass ($A_S$) of the resin compound (A), the solid mass ($B_S$) of the cationic urethane resin emulsion (B), and the solid mass ($C_S$) of the silane coupling agent (C), represented by $[(C_S)/\{(A_S)+(B_S)+(C_S)\}]$, is from 0.60 to 0.85, (3) a ratio of the solid mass ($C_S$) of the silane coupling agent (C) to a titanium equivalent mass ($D_{Ti}$) of the organic titanium chelate compound (D), represented by $\{(C_S)/(D_{Ti})\}$, is from 50 to 70, (4) a ratio of a vanadium equivalent mass ($E_V$) of the tetravalent vanadium compound (E) to the titanium equivalent mass ($D_{Ti}$) of the organic titanium chelate compound (D), represented by $\{(E_V)/(D_{Ti})\}$, is from 0.30 to 0.50, (5) a ratio of a molybdenum equivalent mass ($F_{Mo}$) of the molybdate compound (F) to a total of the solid mass ($A_S$) of the resin compound (A), the solid mass ($B_S$) of the cationic urethane resin emulsion (B), and the solid mass ($C_S$) of the silane coupling agent (C), represented by $[(F_{Mo})/\{(A_S)+(B_S)+(C_S)\}]$, is from 0.003 to 0.030, and (6) a ratio of a fluorine equivalent mass (GF) of the fluorine compound (G) to a total of the solid mass ($A_S$) of the resin compound (A), the solid mass ($B_S$) of the cationic urethane resin emulsion (B), and the solid mass ($C_S$) of the silane coupling agent (C), represented by $[(GF)/\{(A_S)+(B_S)+(C_S)\}]$, is from 0.101 to 0.200,

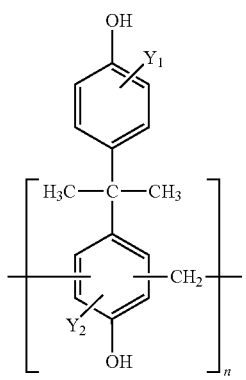

(I)

where $Y_1$ and $Y_2$ bonded to benzene rings each independently represent a hydrogen atom or a Z group represented by general formula (II) or (III) below, where an average number of substituent Z groups per benzene ring is from 0.2 to 1.0, and n represents an integer from 2 to 50,

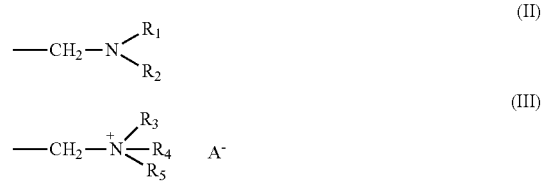

where $R_1$, $R_2$, $R_3$, $R_4$, and $R_5$ each independently represent a hydrogen atom, a $C_1$-$C_{10}$ alkyl group, or a $C_1$-$C_{10}$ hydroxyalkyl group, and $A^-$ represents a hydroxide ion or an acid ion.

[2] The method of producing a surface-treated steel sheet for organic resin coating according to aspect [1], wherein the drying of the surface-treatment solution is performed under a condition where a peak metal temperature is from 50° C. to 180° C.

[3] A surface-treated steel sheet for organic resin coating produced by the method as recited in aspect [1] or [2].

[4] A method of producing an organic resin coated steel sheet, the method comprising:
the method of producing a surface-treated steel sheet for organic resin coating as recited in aspect [1] or [2]; and
forming an organic resin layer on the surface-treatment layer of the surface-treated steel sheet for organic resin coating.

[5] The method of producing an organic resin coated steel sheet according to aspect [4], wherein the organic resin layer is formed by laminating an organic resin film on the surface-treatment layer.

[6] The method of producing an organic resin coated steel sheet according to aspect [5], wherein the organic resin film has a thickness of 60 μm or more.

[7] The method of producing an organic resin coated steel sheet according to aspect [5] or [6], wherein the organic resin film is at least one film selected from the group consisting of a polyvinyl chloride film, a polyolefin-based film, a polyester-based film, and a fluororesin-based film.

[8] An organic resin coated steel sheet produced by the method of producing an organic resin coated steel sheet as recited in any one of aspects [4] to [7].

Advantageous Effect

According to the method of producing a surface-treated steel sheet for organic resin coating disclosed herein, it is possible to produce a surface-treated steel sheet that has a surface-treatment layer free from chromium compounds, that is excellent not only in blackening resistance but also in (i) corrosion resistance when an organic resin layer of 60 μm or more in thickness or an organic resin layer with small elongation is formed on a surface-treated steel sheet, and (ii) adhesion between the organic resin layer and the surface-treatment layer and adhesion between the surface-treatment layer and the coated or plated layer when the surface-treated steel sheet is subjected to processing under a severe condition after formation of the organic resin layer thereon, and that is excellent in storage stability of the surface-treatment solution used.

DETAILED DESCRIPTION

[Zinc or Zinc Alloy Coated or Plated Steel Sheet]

The zinc or zinc alloy coated or plated steel sheet used in the present disclosure may include, for example, an electrogalvanized steel sheet, a hot-dip galvanized steel sheet, a Zn—Al coated or plated steel sheet, a Zn—Al—Mg coated or plated steel sheet, a Zn—Mg coated or plated steel sheet, a Zn—Fe coated or plated steel sheet, and a Zn—Ni coated or plated steel sheet. The coating or plating method may be either electroplating or hot dip coating. In addition, the zinc or zinc alloy coated or plated steel sheet may be produced by adding small amounts of Ni or Co to the coating layer for the purpose of improving the blackening resistance of the zinc or zinc alloy coated or plated steel sheet, or by using an acid or alkaline solution containing Ni, Co, or Fe to deposit these metals on a surface thereof. The coating weight of the surface-treatment layer per surface of the zinc or zinc alloy coated or plated steel sheet is desirably 5 g/m² or more from the viewpoint of ensuring corrosion resistance.

[Surface-Treatment Solution]

The surface-treatment solution used in the present disclosure contains a resin compound (A) having a specific bisphenol skeleton, a cationic urethane resin emulsion (B), a silane coupling agent (C) having a specific reactive functional group, an organic titanium chelate compound (D), a tetravalent vanadium compound (E), a molybdate compound (F), a fluorine compound (G), and water.

<Resin Compound (A)>

The resin compound (A) contained in the surface-treatment solution has a bisphenol skeleton represented by the following general formula (I):

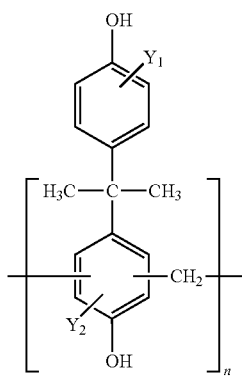

where $Y_1$ and $Y_2$ bonded to benzene rings each independently represent a hydrogen atom or a Z group represented by general formula (II) or (III) below, where an average number of substituent Z groups per benzene ring is from 0.2 to 1.0, and n represents an integer from 2 to 50.

As used herein, the "average number of substituent Z groups" represents a value obtained by dividing the total number of Z groups introduced by the total number of benzene rings (i.e., 2n). In the present disclosure, when a Z group is selected as at least one of $Y_1$ or $Y_2$, the resin compound (A) may dissolve more stably in the surface-treatment solution because it has at least one cationic functional group selected from the group consisting of a secondary amino group, a tertiary amino group, and a quaternary ammonium base. If the average number of substituent Z groups is less than 0.2, the stability of the surface-treatment solution is reduced, and if the average number exceeds 1.0, the corrosion resistance set forth in item (i) and the adhesion set forth in item (ii) (especially after the boiling water test) are degraded. In the present disclosure, the number-average degree of polymerization n is from 2 to 50. If n is less than 2, the corrosion resistance set forth in item (i) is insufficient. On the other hand, if n exceeds 50, the stability of the resin compound (A) in the surface-treatment solution decreases due to reduced water solubility and thickening, resulting in insufficient storage stability. Preferably, n is from 2 to 10.

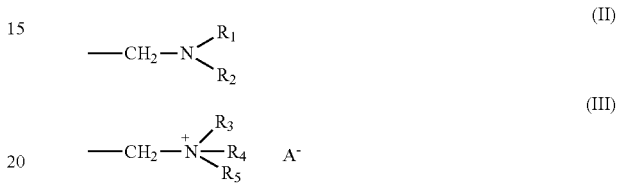

In formulas (II) and (III), $R_1$, $R_2$, $R_3$, $R_4$, and $R_5$ each independently represent a hydrogen atom, a $C_1$-$C_{10}$ alkyl group, or a $C_1$-$C_{10}$ hydroxyalkyl group. If the carbon number of the alkyl or hydroxyalkyl group exceeds 10, the resin compound (A) cannot be sufficiently water soluble and becomes unstable in the surface-treatment solution.

Specific examples of $R_1$, $R_2$, $R_3$, $R_4$, and $R_5$ include methyl, ethyl, propyl, butyl, hydroxyethyl, 2-hydroxypropyl, hydroxyisobutyl, and the like. $A^-$ represents a hydroxide ion or an acid ion. Specific examples of the acid ion include an acetate ion, a phosphate ion, a formate ion, and the like.

The resin compound (A) represented by general formula (I) is a bisphenol-formalin condensate and a synthesis method thereof is not particularly restricted. Such a condensate as described above can be obtained, for example, by reacting bisphenol A with formalin and amine(s) in the presence of alkali catalyst.

<Cationic Urethane Resin Emulsion (B)>

The cationic urethane resin emulsion (B) contained in the surface-treatment solution is not particularly restricted in terms of polyol and isocyanate components as monomer components and the polymerization method thereof as long as the cationic urethane resin emulsion (B) has at least one cationic functional group selected from the group consisting of primary to tertiary amino groups and a quaternary ammonium base. Examples of the cationic functional group include, for example, amino groups, methylamino groups, ethylamino groups, dimethylamino groups, diethylamino groups, trimethylamino groups, triethylamino groups, and the like. However, the cationic functional group is not so limited as long as it is any one of primary to tertiary amino groups or a quaternary ammonium base.

<Silane Coupling Agent (C)>

The silane coupling agent (C) contained in the surface-treatment solution is not limited as long as it has at least one reactive functional group selected from the group consisting of an active hydrogen-containing amino group, an epoxy group, a mercapto group, and a methacryloxy group. Among these particularly preferred is trialkoxysilane having three alkoxy groups. Specific examples thereof may include N-(2-aminoethyl)3-aminopropyltrimethoxysilane, 3-aminopropyltrimethoxysilane, 3-glycidoxypropyltrimethoxysilane, 3-glycidoxypropylmethyldimethoxysilane, 3-methacryloxypropyltrimethoxy-silane, 2-(3,4-epoxycyclohexyl)ethyltriethoxysilane, and 3-mercaptopropyl-trimethoxysilane.

<Organic Titanium Chelate Compound (D)>

Examples of the organic titanium chelate compound (D) contained in the surface-treatment solution include, but are not limited to, titanium acetylacetonate, titanium octyleneglycolate, titanium tetraacetylacetonate, and titanium ethylacetoacetate. Inorganic salts such as titanium nitrate, titanium sulfate, titanium acetate, titanium phosphate, and titanium carbonate are not preferred because they are not effective in improving the corrosion resistance set forth in item (i). In a case where the organic titanium chelate compound (D) is used in a water-dissolved state where titanium is dissolved as a chelate complex in water, it is preferable not to add a water-soluble solvent or peroxide having high polarity, which may affect the complex, to the treatment liquid.

<Tetravalent Vanadium Compound (E)>

Examples of the tetravalent vanadium compound (E) contained in the surface-treatment solution include, but are not limited to, vanadyl sulfate, vanadyl dichloride, vanadyl phosphate, vanadyl oxalate, and vanadyl acetylacetonate. From the viewpoint of obtaining a higher effect of improving the corrosion resistance, a vanadium compound that produces $VO^{2+}$ (vanadyl) ions is preferred as the tetravalent vanadium compound (E). Pentavalent vanadium compounds (e.g., ammonium metavanadate) are not used in the present disclosure because they are too water soluble and thus easily leach out of the layer, resulting in insufficient adhesion set forth in item (ii) (especially after the boiling water test).

<Molybdate Compound (F)>

Examples of the molybdate compound (F) contained in the surface-treatment solution include, but are not limited to, molybdic acid, ammonium molybdate, sodium molybdate, potassium molybdate, magnesium molybdate, and zinc molybdate, as well as phosphomolybdic acid, ammonium phosphomolybdate, and sodium phosphomolybdate. In the present disclosure, at least one selected from these compounds is preferably used as the molybdate compound (F).

<Fluorine Compound (G)>

Examples of the fluorine compound (G) contained in the surface-treatment solution include, but are not limited to, acids such as hydrofluoric acid, fluorosilicic acid, fluoroboric acid, fluorotitanic acid, acid ammonium fluoride, sodium fluoride, and fluorozirconic acid, and salts thereof. In the present disclosure, at least one selected from these compounds is preferably used as the fluorine compound (F).

$[(B_S)/\{(A_S)+(B_S)+(C_S)\}]$=from 0.10 to 0.30

In the surface-treatment solution, it is necessary that a ratio of the solid mass $(B_S)$ of the cationic urethane resin emulsion (B) to a total of the solid mass $(A_S)$ of the resin compound (A), the solid mass $(B_S)$ of the cationic urethane resin emulsion (B), and the solid mass $(C_S)$ of the silane coupling agent (C), represented by $[(B_S)/\{(A_S)+(B_S)+(C_S)\}]$, be from 0.10 to 0.30. If the mass ratio is less than 0.10, the ratio of the urethane resin is too small and the surface-treatment layer tends to be hard. Accordingly, the surface-treatment layer will be damaged when the surface-treated steel sheet is subjected to processing after formation of the organic resin layer on the top layer, causing the surface-treatment layer to peel off from the organic resin layer formed on top of it originating from the damaged part. In other words, the adhesion set forth in item (ii) (especially adhesion after the boiling water test) is degraded. Therefore, the mass ratio is 0.10 or more, and preferably 0.12 or more. On the other hand, if the mass ratio exceeds 0.30, the adhesion set forth in item (ii) (especially adhesion after the boiling water test) is inferior. Therefore, the mass ratio is 0.30 or less, and preferably 0.28 or less.

$[(C_S)/\{(A_S)+(B_S)+(C_S)\}]$=from 0.60 to 0.85

In the surface-treatment solution, it is necessary that a ratio of the solid mass $(C_S)$ of the silane coupling agent (C) to a total of the solid mass $(A_S)$ of the resin compound (A), the solid mass $(B_S)$ of the cationic urethane resin emulsion (B), and the solid mass $(C_S)$ of the silane coupling agent (C), represented by $[(C_S)/\{(A_S)+(B_S)+(C_S)\}]$, be from 0.60 to 0.85. If the mass ratio is less than 0.60, the adhesion set forth in item (ii) (especially adhesion after the boiling water test) is inferior. Therefore, the mass ratio is 0.60 or more, and preferably 0.65 or more. On the other hand, if the mass ratio exceeds 0.85, the storage stability of the surface-treatment solution decreases. Therefore, the mass ratio is 0.85 or less, and preferably 0.80 or less.

$\{(C_S)/(D_{Ti})\}$=from 50 to 70

In the surface-treatment solution, it is necessary that a ratio of the solid mass $(C_S)$ of the silane coupling agent (C) to the titanium equivalent mass $(D_{Ti})$ of the organic titanium chelate compound (D), represented by $\{(C_S)/(D_i)\}$, be from 50 to 70. If the mass ratio is less than 50, the corrosion resistance set forth in item (i) and the adhesion set forth in item (ii) (especially adhesion after the boiling water test) are degraded. Therefore, the mass ratio is 50 or more, and preferably 55 or more. On the other hand, if the mass ratio exceeds 70, the leachability of the surface-treatment layer increases and the adhesion set forth in item (ii) (especially adhesion after the boiling water test) is inferior. Therefore, the mass ratio is 70 or less, and preferably 65 or less.

In calculating the various mass ratios in the present disclosure, the solid mass $(C_S)$ of the silane coupling agent (C) is defined as the mass of the silane coupling agent (C) in a state where alkoxysilane $(R-Si(-OR_1)_3)$ thereof has been rendered to silanol $(R-Si(-OH)_3)$ as a result of hydrolysis. This is because most of the silane coupling agent is hydrolyzed when dissolved in water, and the alcohol produced by hydrolysis volatilizes when the surface-treatment solution is applied and dried to form the surface-treatment layer and does not act as the active ingredient.

$\{(E_V)/(D_{Ti})\}$=from 0.30 to 0.50

In the surface-treatment solution, it is necessary that a ratio of the vanadium equivalent mass $(E_V)$ of the tetravalent vanadium compound (E) to the titanium equivalent mass $(D_{Ti})$ of the organic titanium chelate compound (D) be from 0.30 to 0.50. If the mass ratio is less than 0.30, the corrosion resistance set forth in item (i) is degraded. Therefore, the mass ratio is 0.30 or more, and preferably 0.35 or more. On the other hand, if the mass ratio exceeds 0.50, the adhesion set forth in item (ii) (especially adhesion after the boiling water test) is inferior. Therefore, the mass ratio is 0.50 or less, and preferably 0.48 or less.

$[F_{Mo}/\{(A_S)+(B_S)+(C_S)\}]$=from 0.003 to 0.030

In the surface-treatment solution, it is necessary that a ratio of the molybdenum equivalent mass $(F_{MO})$ of the molybdate compound (F) to a total of the solid mass $(A_S)$ of the resin compound (A), the solid mass $(B_S)$ of the cationic urethane resin emulsion (B), and the solid mass $(C_S)$ of the silane coupling agent (C), represented by $[(F_{Mo})/\{(A_S)+(B_S)+(C_S)\}]$, be from 0.003 to 0.030. If the mass ratio is less than 0.003, the blackening resistance is degraded. Therefore, the mass ratio is 0.003 or more, and preferably 0.006 or more. On the other hand, if the mass ratio exceeds 0.030, the storage stability of the surface-treatment solution decreases. Therefore, the mass ratio is 0.030 or less.

$[(G_F)/\{(A_S)+(B_S)+(C_S)\}]$=from 0.101 to 0.200

In the surface-treatment solution, it is necessary that a ratio of the fluorine equivalent mass $(G_F)$ of the fluorine compound (G) to a total of the solid mass $(A_S)$ of the resin compound (A), the solid mass ($B_S$) of the cationic urethane resin emulsion (B), and the solid mass ($C_S$) of the silane coupling agent (C), represented by $[(G_F)/\{(A_S)+(B_S)+(C_S)\}]$, be from 0.101 and 0.200. If the mass ratio is less than 0.101, the adhesion set forth in item (ii) (especially adhesion after the boiling water test) is inferior. Therefore, the mass ratio is 0.101 or more, and preferably 0.105 or more. On the other hand, if the mass ratio exceeds 0.200, the soluble components of the surface-treatment layer increase, and the corrosion resistance set forth in item (i) and the adhesion set forth in item (ii) (especially adhesion after the boiling water test) are degraded. Therefore, the mass ratio is 0.200 or less.

pH=from 4 to 5

The pH of the surface-treatment solution is from 4 to 5. If the pH is less than 4, the amount of zinc leaching from the coated or plated layer of the zinc or zinc alloy coated or plated steel sheet is increased and the corrosion resistance set forth in item (i) is degraded. On the other hand, if the pH exceeds 5, the storage stability of the surface-treatment solution cannot be ensured.

Preferred acidic agents used to adjust the pH in the range of 4 to 5 are phosphoric acid (orthophosphoric acid), acetic acid, formic acid, hydrofluoric acid, and fluoride. Acetic acid and formic acid are weak acids, and preferable in terms of pH adjustment. Furthermore, they are highly volatile and volatilize when the surface-treatment solution dries, leaving less residue in the surface-treatment layer, which is desirable because there is little performance degradation even when they are added in excess. On the other hand, as an alkaline agent used to adjust the pH in the range of 4 to 5, such as when the pH becomes too low, ammonia water and amines with boiling points of 100° C. or below are preferably used.

<Water>

It is preferable that the water contained in the surface-treatment solution have little effect on the resin compound (A), the cationic urethane resin emulsion (B), the silane coupling agent (C), and the organic titanium chelate compound (D), and on the acid or alkali components used for pH adjustment. Impurities in water, such as Na and Cl, can reduce corrosion resistance and paintability if they remain in the layer. Therefore, water containing less impurities is preferable. For example, water with an electrical conductivity of less than 100 μS/cm is preferable. The electrical conductivity of water is more preferably 50 μS/cm or less, and even more preferably 10 μS/cm or less.

<Solid Concentration>

The surface-treatment solution preferably has a solid concentration of from 0.05 mass % to 5 mass % when dried at 110° C. for 2 hours. This is because, when the solid concentration is in the range of 0.05 mass % to 5 mass %, it is easier to ensure the coating weight of the surface-treatment layer as described below, and also to ensure the stability of the surface-treatment solution.

<Other Components>

Optionally, an antifoaming agent or a wettability-improving agent may be added to the surface-treatment solution. The antifoaming agent is not limited to a particular type, and a silicone-based or aliphatic acid-based emulsion-type antifoaming agent can be used. The wettability-improving agent lowers surface tension of the surface-treatment solution, thereby improving the wettability of the surface-treatment solution with respect to a zinc or zinc alloy coated or plated steel sheet and making the appearance of the steel sheet satisfactorily uniform. Examples of the wettability-improving agent include, but are not limited to, an aqueous solvent such as ethanol, T-butanol, or butyl cellosolve. A wettability-improving agent containing acetylene is preferable because it also causes an antifoaming effect. A nitrate salt such as nickel nitrate or ammonium nitrate may be added to the surface-treatment solution in order to further improve the blackening resistance. In the surface-treatment solution, the solid content of the other components including an antifoaming agent, a wettability-improving agent, and a nitrate salt is 7 mass % or less.

[Method of Producing Surface-Treated Steel Sheet for Organic Resin Coating]

The method of producing a surface-treated steel sheet for organic resin coating comprises applying the aforementioned surface-treatment solution to a surface of a zinc or zinc alloy coated or plated steel sheet to form a surface-treatment layer having a coating weight per surface of 0.005 g/m² to 0.18 g/m² after drying of the surface-treatment solution. This set up enables production of a surface-treated steel sheet for organic resin coating that has the surface-treatment layer free from chromium compounds and that is excellent not only in blackening resistance but also in corrosion resistance set forth in item (i) and adhesion set forth in item (ii).

The surface-treatment solution may be applied to the surface of the zinc or zinc alloy coated or plated steel sheet by an application method, dip coating method, or spray method. Application methods include roll coating (such as three-roll coating or two-roll coating), squeeze coating, die coating, and bar coating. After the application of the surface-treatment solution, the coating weight may be adjusted or the appearance or film thickness may be made uniform using air knife or squeezing rolls.

Peak Metal Temperature=from 50° C. to 180° C.

After the application of the surface-treatment solution, heating and drying is usually performed without water washing. Examples of the heating and drying means include a drier, a hot air oven, a high frequency induction heater, an infrared furnace, and the like. When the surface-treatment solution comes into contact with a surface of the zinc or zinc alloy coated or plated steel sheet, the coating or plating components and the fluorine compound (G), which is a reactive component in the surface-treatment solution, react on the surface layer of the zinc or zinc alloy coated or plated layer to form a reactive layer of the coating or plating components and fluorides or the like, and a surface-treatment layer is formed as the surface-treatment solution dries. As a result, the present inventors speculate that the adhesion between the coated or plated layer and the surface-treatment layer is improved. If the amount of (G) is too large, the fluorine compound that was not consumed in the reaction at the interface between the coated or plated layer and the surface-treatment layer remain in the surface-treatment layer, forming regions where the surface-treatment layer is not fully formed. As a result, the corrosion resistance when the organic resin layer is formed decreases, and the adhesion between the organic resin layer and the surface-treatment layer after the boiling water test decreases. However, the present inventors speculate that reactive components that were not consumed in the reaction at the interface between the coated or plated layer and the surface-treatment solution remain in the surface-treatment layer as soluble components to a moderate extent, allowing a mixed layer to form at the interface between the organic resin layer and the surface-treatment layer, and making it possible to improve the adhesion of the organic resin layer and the surface-treatment layer. The surface-treatment layer also contains water-soluble solvents derived from the wettability-improving agent and surfactants derived from the resin compound (A) or cationic urethane resin emulsion (B). Therefore, even if the treatment solution that forms the organic resin layer is solvent-based, reactive components are thought to be mixed into the organic resin side, although in small amounts. To achieve the above effect, the peak metal temperature is preferably 50° C. or higher. If the temperature is lower than 50° C., the remaining reactive components in the surface-treatment layer become excessive, resulting in insufficient formation of the surface-treatment layer. In addition, the surface-treatment layer will be damaged when processing is applied after formation of the organic resin layer, causing the surface-treatment layer to peel off from the organic resin film formed on top of it originating from the damaged part. The temperature is preferably 70° C. or higher. On the other hand, if the temperature exceeds 180° C., the amount of reactive components remaining in the surface-treatment layer decreases, and a mixed layer will not be formed at the interface between the surface-treatment layer and the organic resin layer formed on top of it, impairing the adhesion-improving effect at the interface between the surface-treatment layer and the organic resin layer. Therefore, the peak metal temperature is preferably 180° C. or lower, more preferably 140° C. or lower, and even more preferably 110° C. or lower. The holding time at the peak metal temperature is desirably shorter than 15 seconds.

Coating Weight of Surface-Treatment Layer Per Surface=from 0.005 g/m$^2$ to 0.18 g/m$^2$ In the present disclosure, it is necessary that the coating weight of the surface-treatment layer per surface be from 0.005 g/m$^2$ to 0.18 g/m$^2$. If the coating weight is less than 0.005 g/m$^2$, the corrosion resistance set forth in item (i) and the adhesion set forth in item (ii) (especially adhesion after the boiling water test) are degraded. Therefore, the coating weight is 0.005 g/m$^2$ or more, and preferably 0.010 g/m$^2$ or more. On the other hand, if the coating weight exceeds 0.18 g/m$^2$, the surface-treatment layer will be damaged when processing is applied after formation of the organic resin layer, causing the surface-treatment layer to peel off from the organic resin layer formed on it originating from the damaged part. In other words, the adhesion set forth in item (ii) (especially adhesion after the boiling water test) is degraded. Therefore, the coating weight is 0.18 g/m$^2$ or less, and preferably 0.14 g/m$^2$ or less.

The aforementioned surface-treatment layer may be formed on one or both surfaces of the zinc or zinc alloy coated or plated steel sheet.

[Action of Present Disclosure]

Although it is reasonably assumed that the respective components cause following effects in the surface-treatment solution of the present disclosure, these assumptions put no restriction on the present disclosure.

The main components of the surface-treatment solution used in the present disclosure are the resin compound (A), the cationic urethane resin emulsion (B), and the silane coupling agent (C), and these main components form the framework of the surface-treatment layer.

The resin compound (A) has bisphenol as the phenolic skeleton, which makes it difficult to dissolve in polar solvents (imparting solvent resistance) and improves the corrosion resistance set forth in item (i).

However, the resin compound (A) tends to harden the surface-treatment layer. Accordingly, the surface-treatment layer will be damaged when processing is applied after formation of the organic resin layer, causing the surface-treatment layer to peel off from the organic resin layer formed on top of it originating from the damaged part. Therefore, in the present disclosure, the hardening of the phenol resin can be suppressed by blending the cationic urethane resin emulsion (B), thereby preventing the surface-treatment layer from being damaged by the processing applied.

While the cationic urethane resin emulsion (B) has the above effects, the adhesion between the organic resin layer and the surface-treatment layer and the adhesion between the surface-treatment layer and the coated or plated layer is weak. Accordingly, when an organic resin layer is formed, the adhesion with the organic resin layer and the adhesion between the surface-treatment layer and the coated or plated layer are insufficient. Therefore, the silane coupling agent (C) is blended. The silane coupling agent (C) produces an active silanol group (Si—OH) as a result of hydrolysis of an alkoxy group at the end, causing bonding to the surface(s) of the zinc or zinc alloy coated or plated steel sheet. This contributes to improved adhesion between the surface-treatment layer and the coated or plated layer when an organic resin layer is formed. The silane coupling agent also contributes to improved adhesion with the organic resin layer because it has an organic functional group. In addition, the silane coupling agent (C) is partially dehydration-condensed to produce a siloxane bond (Si—O—Si), which is successively polymerized (polysiloxanation: —Si—O—Si—O—Si—). This results in an extremely stable structure and improves the corrosion resistance set forth in item (i) and the adhesion set forth in item (ii) (especially adhesion after the boiling water test).

It is thus believed that by using the resin compound (A), the cationic urethane resin emulsion (B), and the silane coupling agent (C) in proper proportions as the main components of the surface-treatment solution, various performances can be obtained in good balance. However, the above main components alone cannot necessarily ensure corrosion resistance after organic resin coating when the coating weight of the surface-treatment layer is small, as in the present disclosure. Therefore, the surface-treatment solution used in the present disclosure contains the organic titanium chelate compound (D) as an essential component in addition to the above main components. The organic titanium chelate compound (D) presumably functions as a catalyst for facilitating polysiloxanation when the surface-treatment solution is dried to form a surface-treatment layer. This ensures corrosion resistance after organic resin coating even when the coating weight of the surface-treatment layer is small.

To obtain these effects, as described above, the organic titanium chelate compound (D) needs to be contained in a predetermined amount, which is determined in accordance with the content of the silane coupling agent (C). If the amount of (D) is too small, the desired effect cannot be obtained. If the amount of (D) is excessive, the amount of polysiloxane increases too much, resulting in a hard and brittle surface-treatment layer. Accordingly, the surface-treatment layer will be damaged when processing is applied after formation of the organic resin layer, causing the surface-treatment layer to peel off from the organic resin layer formed on top of it originating from the damaged part. In other words, the adhesion set forth in item (ii) (especially adhesion after the boiling water test) is degraded. In addition, while polysiloxanation caused by the organic titanium chelate compound (D) is ideally promoted during formation of the surface-treatment layer, polysiloxanation is also promoted during storage of the surface-treatment solution. Thus, if the content of (D) is excessive, storage stability (i.e. suppression of increase in viscosity and gelling) will be reduced and, after storage of the surface-treatment solution, the same quality as before storage will not be obtained.

The tetravalent vanadium compound (E) is also an essential component in the surface-treatment solution in the present disclosure. In the present disclosure, it is presumed that the tetravalent vanadium compound (E) acts as an inhibitor of corrosion, such as passivating zinc in the coated or plated layer. In particular, vanadyl ions [$VO^{2+}$], which have one oxygen, do not leach out easily even in a wet environment, and remain in the surface-treatment layer to exert an inhibitor effect. Thus, vanadyl ions presumably prevent degradation of corrosion resistance in a region where scratches occur on the surface-treatment layer or the coated or plated surface itself. The present inventors presume that such effects are achieved when the skeleton of the layer having a cationic functional group is adequately formed, and by a synergetic effect caused by the presence of Ti, which also exists as a cation.

Furthermore, the surface-treatment solution used in the present disclosure also contains the molybdate compound (F) as an essential component. The zinc or zinc alloy coated or plated steel sheet, regardless of whether it is an electroplated or hot dip coated steel sheet, is prone to black patina phenomenon, in which the coated or plated surface turns black under corrosion environments. In particular, in a hot-dip zinc or zinc alloy coated or plated steel sheet, when Mg or Al is added to improve corrosion resistance or adhesion between the coated or plated layer and the base steel sheet, these elements will be concentrated at the interface between the coated or plated layer and the base steel sheet or at the surface layer of the coated or plated layer, and blackening will be promoted, resulting in the steel sheet assuming a darker color compared to a steel sheet subjected to zinc-only galvanization. Although the cause of the black patina phenomenon in a zinc or zinc alloy coated or plated steel sheet is still unclear, it is believed that the zinc oxide formed on the top surface of the coated or plated layer is deprived of oxygen and turns into oxygen-depleted zinc oxide, or that oxygen-depleted zinc oxide is formed on the coated or plated surface due to insufficient oxygen supply in the zinc corrosion (oxidation) process, providing the steel sheet with darker appearance.

In the present disclosure, excellent blackening resistance can be obtained by introducing the molybdate compound (F) into the surface-treatment layer. Molybdenum is a transition metal and forms molybdenum oxides ($MoO_2$ or $MoO_3$) or molybdic acids ($MoO_4^{2-}$) by combining with oxygen. In the present disclosure, molybdic acids ($MoO_4^{2-}$) are partially converted to molybdenum oxides ($MoO_2$ or $MoO_3$) under high temperature and high humidity or in a corrosion environment, causing oxygen to be properly supplied to the surface of the galvanized layer. This is thought to reduce the formation of oxygen-deficient zinc oxides. The present inventors presume that this mechanism improves the blackening resistance.

It is important for the surface-treatment solution used in the present disclosure to contain the fluorine compound (G) as an essential component. The present inventor speculate that this is because the addition of the fluorine compound (G) causes the formation of a reaction layer of the coating or plating components and fluorides or the like on the surface layer of the zinc or zinc alloy coated or plated layer when the surface-treatment solution comes into contact with a surface of the zinc or zinc alloy coated or plated steel sheet, thereby improving the adhesion between the coated or plated layer and the surface-treatment layer. If the amount of (G) is small, a reaction layer is not uniformly formed on the surface layer of the coated or plated layer, causing the surface-treatment layer to peel off at the interface between the coated or plated layer and the surface-treatment layer when the organic resin layer is formed. On the other hand, if the amount of (G) is too large, fluorine compounds that have not been consumed in the reaction at the interface between the coated or plated layer and the surface-treatment layer remain in the surface-treatment layer, resulting in reduced corrosion resistance when the organic resin layer is formed and reduced adhesion between the organic resin layer and the surface-treatment layer after the boiling water test. However, by lowering the coating weight of the surface-treatment layer and lowering the drying temperature (or shortening the drying time), it is possible to form a thin and uniform reaction layer on the surface of the coated or plated layer and to leave an appropriate amount of unreacted fluorine compounds in the surface-treatment layer. This ensures the corrosion resistance set forth in item (i) and the adhesion set forth in item (ii) (especially adhesion after the boiling water test). Hydrofluoric acid and its salts, ammonium fluoride, and sodium fluoride, which tend to produce $F^-$ ions, are preferred because in particular they are effective in improving the adhesion between the surface-treatment layer and the coated or plated layer, and they tend to leave an appropriate amount of soluble components in the layer.

[Organic Resin Coated Steel Sheet and Method of Producing Same]

The organic resin coated steel sheet according to the present disclosure is obtainable by forming an organic resin layer on the surface-treatment layer of the surface-treatment steel sheet as described above. The method of forming the organic resin layer can be freely selected. For example, the method may include applying and drying a paint composition or laminating an organic resin film. As the paint composition, an acrylic resin, an epoxy resin, a urethane resin, a phenolic resin, a polyester resin, or a mixture thereof can be suitably used. The organic resin film is preferably one or more films selected from the group consisting of a polyvinyl chloride film, a polyolefin-based film, a polyester-based film, and a fluororesin-based film, or a laminate of two or more of these stacked on top of one another. The thickness of the organic resin layer is preferably 60 μm or more, and more preferably 100 μm or more. Although the upper limit is not particularly limited, the thickness is 600 μm or less.

In addition, the organic resin coated steel sheet has excellent corrosion resistance set forth in item (i) and excellent adhesion set forth in item (ii) (especially adhesion after the boiling water test).

Various additives, including non-chrome rust inhibitors, solid lubricants, colored pigments, and the like can be blended into the organic resin layer.

EXAMPLES

As the components of surface-treatment solutions, resin compounds (A) listed in Table 1 (Tables 1a and 1b), urethane resin emulsions (B) listed in Table 2, silane coupling agents (C) listed in Table 3, titanium compounds (D) listed in Table 4, vanadium compounds (E) listed in Table 5, molybdate compounds (F) listed in Table 6, and fluorine compounds (G) listed in Table 7 were used. A variety of zinc or zinc alloy coated or plated steel sheets were also prepared as listed in Table 8.

The components listed in Tables 1-7 were mixed in the proportions listed in Tables 9-1 and 9-2. After adjusting the pH with acetic acid or ammonia to the values listed in Table 9-2, deionized water was added so that the solid concentrations as listed in Table 10 were obtained when dried at 110° C. for 2 hours to prepare surface-treatment solutions. The deionized water used was ion-exchange water having electrical conductivity of 10 μS/cm. The mass ratios (X1) to (X6) listed in Table 9-2 represent the mass ratios (1) to (6) specified in claim 1, respectively.

The surface-treatment solutions were each applied to one side of each of the zinc or zinc alloy coated or plated steel sheets listed in Table 10 using a roll coater, and without water washing, heating and drying were performed so that the peak metal temperatures (PMT) listed in Table 10 were reached to produce surface-treated steel sheets. The coating weight of the surface-treatment layers per surface was adjusted to the values listed in Table 10, depending on the application conditions (such as roller pressure and rotational speed) and the solid concentrations of the surface-treatment solutions. The coating weight of each surface-treatment layer was obtained by converting the amount of Si in the silane coupling agent (C) blended in the surface-treatment layer quantified using an X-ray fluorescence analyzer.

In addition, the organic resin films or paints listed in Table 11 were prepared. In Table 11, $R_1$ is a polyvinyl chloride film of 200 μm in thickness with high elongation, $R_2$ is a polyester-based film of 100 μm in thickness with low elongation, and $R_3$ is a polyolefin-based film of 100 μm in thickness with low elongation. For each sample, adhesive was applied to the surface-treatment layer to form an adhesive layer with a thickness of 3 μm in a dry state, and heating and drying was performed (peak metal temperature: 80° C.). Then, the organic resin films listed in Table 10 were thermo-compressed at 210° C. to bond them respectively onto the adhesive layers (organic resin layers) to produce organic resin coated steel sheets. In addition, $R_4$ is a polyolefin-based paint composition, which was applied on the surface-treatment layers, and drying was performed at 150° C. for 30 minutes to produce organic resin coated steel sheets.

The samples taken from the surface-treated steel sheets were evaluated for blackening resistance set forth in item (1) below. The samples taken from the organic resin coated steel sheets were evaluated for corrosion resistance and adhesion set forth in items (2) to (6) below. Furthermore, the surface-treatment solutions were evaluated for storage stability set forth in item (7) below. The results are listed in Table 12.

(1) Blackening Resistance

Each sample was placed for 24 hours in a thermo-hygrostat controlled at a temperature of 50° C. and a relative humidity of 95%, and the brightness (Lvalue) change (ΔL=L-value after test−L-value before test) was calculated. The evaluation criteria are as follows. L-values were measured using an $SR_{2000}$ manufactured by Nippon Denshoku Industries Co., Ltd., in SCE mode (removal of normal reflected light).

⦾: −6≤ΔL
○: −10≤ΔL<−6
Δ: −14≤ΔL<−10
×: ΔL<−14

(2) Corrosion Resistance of Organic Resin Coated Steel Sheet

A cross-cut was made on the surface of each 50 mm×100 mm sample, and salt spray test was performed in accordance with JIS-Z-237-1-2000 for 1,000 hours. The corrosion width on one side from the cross-cut was measured. The evaluation criteria are as follows.

⦾: Average corrosion width from the cut was less than 5 mm.
○: Average corrosion width from the cut was 5 mm or more and less than 10 mm.
Δ: Average corrosion width from the cut was 10 mm or more and less than 15 mm.
×: Average corrosion width from the cut was 15 mm or more.

(3) Adhesion 1 of Organic Resin Coated Steel Sheet

A cutter knife was used to make a 5 mm square grid in the center on the sample surface during the Erichsen process described below, and a cut was made to a depth such that it reached the zinc or zinc alloy coated or plated steel sheet, and after stretch forming to 6 mm in the Erichsen tester, the peeled area of the organic resin layer within the 5 mm square grid was measured.

⦾: No peeling.
○: Peeled area was less than 3%.
Δ: Peeled area was 3% or more and less than 10%.
×: Peeled area was 10% or more.

(4) Adhesion 1 of Organic Resin Coated Steel Sheet After Boiling Water Test

Each sample was removed from boiling water after being immersed for 2 hours. Then, the peeled area was measured for each sample in the same manner as in item (3) above.

⦾: No peeling.
○: Peeled area was less than 3%.
Δ: Peeled area was 3% or more and less than 10%.
×: Peeled area was 10% or more.

(5) Adhesion 2 of Organic Resin Coated Steel Sheet

A cutter knife was used to make a 5 mm square grid in the center on the sample surface during the Erichsen process described below, and a cut was made to a depth such that it reached the zinc or zinc alloy coated or plated steel sheet, and after stretch forming to 8 mm in the Erichsen tester, the peeled area of the organic resin layer within the 5 mm square grid was measured.

⦾: No peeling.
○: Peeled area was less than 3%.
Δ: Peeled area was 3% or more and less than 10%.
×: Peeled area was 10% or more.

(6) Adhesion 2 After Organic Resin Coating After Boiling Water Test

Each sample was removed from boiling water after being immersed for 2 hours. Then, the peeled area was measured for each sample in the same manner as in item (5) above.

⦾: No peeling.
○: Peeled area was less than 3%.
Δ: Peeled area was 3% or more and less than 10%.
×: Peeled area was 10% or more.

(7) Storage Stability

After storing each surface-treatment solution in a thermostatic chamber at 40° C. for 30 days, the appearance of each surface-treatment solution was visually examined and evaluated. The evaluation criteria are as follows:

⦾: No change.
○: Very small amount of precipitation was observed.
Δ: Small amount of precipitation was observed or viscosity slightly increased.
×: Large amount of precipitation was observed or gelling occurred.

TABLE 1a

Resin Compound (A)

| | Y1 Z group: general formula (II) | | Y2 Z group: general formula (II) | | Average number of substituent | |
|---|---|---|---|---|---|---|
| No. | R1 | R2 | R1 | R2 | Z groups | n |
| A1 | hydrogen | hydrogen | methyl | ethyl | 0.4 | 5 |
| A2 | ethyl | methyl | hydrogen | propyl | 0.7 | 3 |
| A3 | ethyl | propyl | hydrogen | ethyl | 0.4 | 10 |
| A4 | hydroxyethyl | hydroxyethyl | hydroxyethyl | hydroxyethyl | 0.5 | 5 |
| A5 | —$C_{12}H_{23}$ | methyl | hydrogen | hydrogen | 0.5 | 5 |
| A6 | —$C_{12}H_{22}OH$ | methyl | hydrogen | hydrogen | 0.5 | 5 |
| A7 | hydrogen | hydrogen | methyl | ethyl | 0.1 | 5 |
| A8 | hydrogen | hydrogen | methyl | ethyl | 1.2 | 5 |
| A9 | hydrogen | hydrogen | methyl | ethyl | 0.4 | 80 |

Note:
A group represented by general formula (II) was used as a Z group.

TABLE 1b

Resin Compound (A)

| | Y1 Z group: general formula (III) | | | Y2 Z group: general formula (III) | | | Average number of substituent | |
|---|---|---|---|---|---|---|---|---|
| No. | R3 | R4 | R5 | R3 | R4 | R5 | Z groups | n |
| A10 | hydrogen | hydrogen | methyl | methyl | ethyl | methyl | 0.4 | 5 |
| A11 | ethyl | methyl | hydrogen | hydrogen | propyl | hydrogen | 0.7 | 3 |
| A12 | ethyl | propyl | methyl | hydrogen | ethyl | methyl | 0.4 | 10 |
| A13 | hydroxyethyl | hydroxyethyl | hydrogen | hydroxyethyl | hydroxyethyl | hydrogen | 0.5 | 5 |
| A14 | —$C_{12}H_{23}$ | methyl | hydrogen | hydrogen | hydrogen | hydrogen | 0.5 | 5 |
| A15 | —$C_{12}H_{22}OH$ | methyl | hydrogen | hydrogen | hydrogen | hydrogen | 0.5 | 5 |
| A16 | hydroxyethyl | hydroxyethyl | hydrogen | hydroxyethyl | hydroxyethyl | hydrogen | 0.1 | 5 |
| A17 | hydroxyethyl | hydroxyethyl | hydrogen | hydroxyethyl | hydroxyethyl | hydrogen | 1.2 | 5 |
| A18 | hydroxyethyl | hydroxyethyl | hydrogen | hydroxyethyl | hydroxyethyl | hydrogen | 0.5 | 70 |

Note:
A group represented by general formula (III) was used as a Z group.

TABLE 2

Urethane Resin (B)

| No. | Urethane resin (B) | Ionicity | Manufacturer |
|---|---|---|---|
| B1 | ADEKA BON-TIGHTER HUX-670 | cation | ADEKA Corporation |
| B2 | SUPER FLEX 600 | cation | Daiichi Kogyo Seiyaku Co. |
| B3 | PERMALIN UC-20 | cation | Sanyo Chemical Industries, Ltd. |
| B4 | ADEKA BON-TIGHTER UX-206 | nonion | ADEKA Corporation |
| B5 | Hydran AP-10 | anion | DIC Corporation |

TABLE 3

Silane Coupling Agent (C)

| No. | Silane coupling agent (C) |
|---|---|
| C1 | 3-mercaptopropyltrimethoxysilane |
| C2 | N-(2-aminoethyl)-3-aminopropyltrimethoxysilane |
| C3 | 3-glycidoxypropyltrimethoxysilane |
| C4 | 3-methacryloxypropyltrimethoxysilane |
| C5 | vinyltrimethoxysilane |

TABLE 4

Titanium Compound (D)

| No. | Titanium compound (D) |
|---|---|
| D1 | titanium acetylacetonate (Ti: 12.5 mass %) |
| D2 | titanium tetraacetylacetonate (Ti: 10.8 mass %) |
| D3 | titanium nitrate (Ti: 16.2 mass %) |
| D4 | fluorotitanic acid (Ti: 29.2 mass %) |

TABLE 5

Vanadium Compound (E)

| No. | Vanadium compound (E) |
|---|---|
| E1 | vanadyl oxalate (V: 32.9 mass %) |
| E2 | vanadyl acetylacetonate (V: 19.2 mass %) |
| E3 | vanadyl sulfate (V: 31.2 mass %) |
| E4 | ammonium metavanadate (V: 43.5 mass %) |

TABLE 6

Molybdate Compound (F)

| No. | Molybdate compound (F) |
|---|---|
| F1 | $Na_2MoO_4 \cdot 2H_2O$ |
| F2 | $(NH_4)_6Mo_7O_{24} \cdot 4H_2O$ |
| F3 | $(NH_4)_3[PMo_{12}O_{40}] \cdot 3H_2O$ |

TABLE 7

Fluorine Compound (G)

| No. | Fluorine compound (G) |
|---|---|
| G1 | hydrofluoric acid |
| G2 | fluorosilicic acid |
| G3 | fluorotitanic acid |
| G4 | acid ammonium fluoride |
| G5 | sodium fluoride |

TABLE 8

Zinc or Zinc Alloy Coated Steel Sheet

| No. | Treated blank sheet (coated steel sheet) | Coating weight (g/m²) |
|---|---|---|
| Z1 | hot-dip Zn-4.5 mass % Al-0.6 mass % Mg-0.04 mass % Ni alloy coated steel sheet | 90 |
| Z2 | hot-dip Zn-4.5 mass % Al-0.9 mass % Mg-0.04 mass % Ni alloy coated steel sheet | 60 |
| Z3 | hot-dip Zn-4.5 mass % Al-0.6 mass % Mg alloy coated steel sheet | 40 |
| Z4 | hot-dip Zn-1.5 mass % Al-5.0 mass % Mg alloy coated steel sheet | 90 |
| Z5 | hot-dip Zn-0.2 mass % Al coated steel sheet | 90 |

* Although coating was applied on both surfaces, the above lists the coating weight per surface.

TABLE 9-1

| No. | Classification | (A) Type Table 1 | (A) Solid content mass % | (B) Type Table 2 | (B) Solid content mass % | (C) Type Table 3 | (C) Solid content mass % | (D) Ti Type Table 4 | (D) Ti equivalent mass % | (E) V Type Table 5 | (E) V equivalent mass % | (F) Mo Type Table 6 | (F) Mo equivalent mass % | (G) F Type Table 7 | (G) F equivalent mass % |
|---|---|---|---|---|---|---|---|---|---|---|---|---|---|---|---|
| 1 | Example | A1 | 4.0 | B1 | 16.0 | C1 | 60 | D1 | 1.00 | E1 | 0.40 | F2 | 0.6 | G4 | 9.0 |
| 2 | Example | A1 | 10.0 | B1 | 10.0 | C1 | 60 | D1 | 1.00 | E1 | 0.40 | F2 | 0.6 | G4 | 9.0 |
| 3 | Example | A1 | 11.0 | B1 | 9.0 | C1 | 60 | D1 | 1.00 | E1 | 0.40 | F2 | 0.6 | G4 | 9.0 |
| 4 | Comparative Example | A1 | 14.0 | B1 | 6.0 | C1 | 60 | D1 | 1.00 | E1 | 0.40 | F2 | 0.6 | G4 | 9.0 |
| 5 | Example | A1 | 0.5 | B1 | 21.5 | C1 | 58 | D1 | 1.00 | E1 | 0.40 | F2 | 0.6 | G4 | 9.0 |
| 6 | Example | A1 | 0.5 | B1 | 23.5 | C1 | 56 | D1 | 1.00 | E1 | 0.40 | F2 | 0.6 | G4 | 9.0 |
| 7 | Comparative example | A1 | 0.1 | B1 | 25.9 | C1 | 55 | D1 | 1.00 | E1 | 0.40 | F2 | 0.6 | G4 | 9.0 |
| 8 | Comparative example | A1 | 4.0 | B1 | 16.0 | C1 | 60 | D3 | 1.00 | E1 | 0.40 | F2 | 0.6 | G4 | 9.0 |
| 9 | Comparative example | A1 | 4.0 | B1 | 16.0 | C1 | 60 | D4 | 1.00 | E1 | 0.40 | F2 | 0.6 | G4 | 9.0 |
| 10 | Comparative example | A1 | 4.0 | B1 | 16.0 | C1 | 60 | D1 | 1.00 | — | 0.00 | F2 | 0.6 | G4 | 9.0 |
| 11 | Comparative example | A1 | 4.0 | B1 | 16.0 | C1 | 60 | D1 | 1.00 | E4 | 0.40 | F2 | 0.6 | G4 | 9.0 |
| 12 | Example | A1 | 4.0 | B1 | 16.0 | C2:C3 = 1:1 | 60 | D1 | 1.00 | E1 | 0.40 | F2 | 0.6 | G4 | 9.0 |
| 13 | Example | A2 | 4.0 | B1 | 16.0 | C2 | 60 | D1 | 1.00 | E2 | 0.40 | F2 | 0.6 | G4 | 9.0 |
| 14 | Example | A3 | 4.0 | B1 | 16.0 | C2 | 60 | D2 | 1.00 | E2 | 0.40 | F2 | 0.6 | G4 | 9.0 |
| 15 | Example | A1 | 4.0 | B1 | 16.0 | C3 | 60 | D1 | 1.00 | E2 | 0.40 | F2 | 0.6 | G4 | 9.0 |
| 16 | Comparative Example | A1 | 19.0 | B1 | 19.0 | C1 | 45 | D1 | 0.75 | E2 | 0.30 | F2 | 0.6 | G4 | 9.0 |
| 17 | Example | A1 | 12.0 | B1 | 19.0 | C1 | 52 | D1 | 0.85 | E2 | 0.34 | F2 | 0.6 | G4 | 9.0 |
| 18 | Example | A1 | 4.0 | B1 | 11.0 | C1 | 68 | D1 | 1.10 | E2 | 0.44 | F2 | 0.6 | G4 | 9.0 |
| 19 | Comparative example | A1 | 1.0 | B1 | 10.0 | C1 | 72 | D1 | 1.20 | E2 | 0.48 | F2 | 0.6 | G4 | 9.0 |
| 20 | Comparative example | A1 | 4.0 | B1 | 16.0 | C1 | 60 | D1 | 0.80 | E2 | 0.32 | F2 | 0.6 | G4 | 9.0 |
| 21 | Example | A1 | 4.0 | B1 | 16.0 | C1 | 60 | D1 | 0.88 | E2 | 0.35 | F2 | 0.6 | G4 | 9.0 |
| 22 | Example | A1 | 4.0 | B1 | 16.0 | C1 | 60 | D1 | 1.15 | E2 | 0.46 | F2 | 0.6 | G4 | 9.0 |
| 23 | Comparative example | A1 | 4.0 | B1 | 16.0 | C1 | 60 | D1 | 1.25 | E2 | 0.50 | F2 | 0.6 | G4 | 9.0 |
| 24 | Comparative example | A1 | 4.0 | B1 | 16.0 | C1 | 60 | D1 | 1.00 | E2 | 0.24 | F2 | 0.6 | G4 | 9.0 |
| 25 | Example | A1 | 4.0 | B1 | 16.0 | C1 | 60 | D1 | 1.00 | E2 | 0.33 | F2 | 0.6 | G4 | 9.0 |
| 26 | Example | A1 | 4.0 | B1 | 16.0 | C1 | 60 | D1 | 1.00 | E2 | 0.49 | F2 | 0.6 | G4 | 9.0 |
| 27 | Comparative Example | A1 | 4.0 | B1 | 16.0 | C1 | 60 | D1 | 1.00 | E2 | 0.55 | F2 | 0.6 | G4 | 9.0 |
| 28 | Example | A1 | 4.0 | B1 | 16.0 | C1 | 60 | D1 | 1.00 | E2 | 0.40 | F2 | 0.3 | G4 | 9.0 |
| 29 | Comparative example | A1 | 4.0 | B1 | 16.0 | C1 | 60 | D1 | 1.00 | E2 | 0.40 | F2 | 0.1 | G4 | 9.0 |
| 30 | Comparative example | A1 | 4.0 | B1 | 16.0 | C1 | 60 | D1 | 1.00 | E2 | 0.40 | — | 0.0 | G4 | 9.0 |

TABLE 9-1-continued

| No. | Classification | (A) Type Table 1 | (A) Solid content mass % | (B) Type Table 2 | (B) Solid content mass % | (C) Type Table 3 | (C) Solid content mass % | (D) Ti Type Table 4 | (D) Ti equivalent mass % | (E) V Type Table 5 | (E) V equivalent mass % | (F) Mo Type Table 6 | (F) Mo equivalent mass % | (G) F Type Table 7 | (G) F equivalent mass % |
|---|---|---|---|---|---|---|---|---|---|---|---|---|---|---|---|
| 31 | Comparative example | A1 | 4.0 | B1 | 16.0 | C1 | 60 | D1 | 1.00 | E2 | 0.40 | F2 | 2.6 | G4 | 9.0 |
| 32 | Example | A1 | 4.0 | B1 | 16.0 | C1 | 60 | D1 | 1.00 | E2 | 0.40 | F2 | 0.6 | G4 | 9.0 |
| 33 | Example | A1 | 4.0 | B1 | 16.0 | C1 | 60 | D1 | 1.00 | E2 | 0.40 | F2 | 0.6 | G4 | 8.4 |
| 34 | Example | A1 | 4.0 | B1 | 16.0 | C1 | 60 | D1 | 1.00 | E2 | 0.40 | F2 | 0.6 | G4 | 8.2 |
| 35 | Example | A1 | 4.0 | B1 | 16.0 | C1 | 60 | D1 | 1.00 | E2 | 0.40 | F2 | 0.6 | G4 | 8.1 |
| 36 | Comparative Example | A1 | 4.0 | B1 | 16.0 | C1 | 60 | D1 | 1.00 | E2 | 0.40 | F2 | 0.6 | G4 | 6.0 |
| 37 | Example | A1 | 4.0 | B1 | 16.0 | C1 | 60 | D1 | 1.00 | E2 | 0.40 | F2 | 0.6 | G4 | 14.0 |
| 38 | Comparative Example | A1 | 4.0 | B1 | 16.0 | C1 | 60 | D1 | 1.00 | E2 | 0.40 | F2 | 0.6 | G4 | 17.0 |
| 39 | Example | A1 | 4.0 | B1 | 16.0 | C1 | 60 | D1 | 1.00 | E2 | 0.40 | F2 | 0.6 | G1 | 9.0 |
| 40 | Example | A1 | 4.0 | B1 | 16.0 | C1 | 60 | D1 | 1.00 | E2 | 0.40 | F2 | 0.6 | G2 | 9.0 |
| 41 | Example | A1 | 4.0 | B1 | 16.0 | C1 | 60 | D1 | 1.00 | E2 | 0.40 | F2 | 0.6 | G3 | 9.0 |
| 42 | Example | A1 | 4.0 | B1 | 16.0 | C1 | 60 | D1 | 1.00 | E2 | 0.40 | F2 | 0.6 | G5 | 9.0 |
| 43 | Comparative example | A1 | 4.0 | B1 | 16.0 | C1 | 60 | D1 | 1.00 | E1 | 0.40 | F1 | 0.6 | G4 | 9.0 |
| 44 | Comparative example | A1 | 4.0 | B1 | 16.0 | C1 | 60 | D1 | 1.00 | E1 | 0.40 | F1 | 0.6 | G4 | 9.0 |
| 45 | Example | A1 | 4.0 | B1 | 16.0 | C1 | 60 | D1 | 1.00 | E1 | 0.40 | F1 | 0.6 | G4 | 9.0 |
| 46 | Example | A1 | 4.0 | B1 | 16.0 | C1 | 60 | D1 | 1.00 | E1 | 0.40 | F1 | 0.6 | G4 | 9.0 |
| 47 | Comparative example | A1 | 4.0 | B1 | 16.0 | C1 | 60 | D1 | 1.00 | E1 | 0.40 | F1 | 0.6 | G4 | 9.0 |
| 48 | Comparative example | A1 | 4.0 | B1 | 16.0 | C1 | 60 | D1 | 1.00 | E1 | 0.40 | F1 | 0.6 | G4 | 9.0 |
| 49 | Comparative example | A1 | 4.0 | B1 | 16.0 | C1 | 60 | D1 | 1.00 | E1 | 0.40 | F1 | 0.6 | G1 | 9.0 |
| 50 | Example | A1 | 4.0 | B1 | 16.0 | C1 | 60 | D1 | 1.00 | E1 | 0.40 | F1 | 0.6 | G1 | 9.0 |
| 51 | Example | A1 | 4.0 | B1 | 16.0 | C1 | 60 | D1 | 1.00 | E1 | 0.40 | F1 | 0.6 | G1 | 9.0 |
| 52 | Example | A1 | 4.0 | B1 | 16.0 | C1 | 60 | D1 | 1.00 | E1 | 0.40 | F1 | 0.6 | G1 | 9.0 |
| 53 | Example | A1 | 4.0 | B1 | 16.0 | C1 | 60 | D1 | 1.00 | E1 | 0.40 | F1 | 0.6 | G1 | 9.0 |
| 54 | Example | A1 | 4.0 | B1 | 16.0 | C1 | 60 | D1 | 1.00 | E1 | 0.40 | F1 | 0.6 | G1 | 9.0 |
| 55 | Comparative Example | A1 | 4.0 | B1 | 16.0 | C1 | 60 | D1 | 1.00 | E1 | 0.40 | F1 | 0.6 | G1 | 9.0 |
| 56 | Example | A1 | 4.0 | B1 | 16.0 | C1 | 60 | D1 | 1.00 | E1 | 0.40 | F1 | 0.6 | G1 | 9.0 |
| 57 | Example | A1 | 4.0 | B1 | 16.0 | C1 | 60 | D1 | 1.00 | E1 | 0.40 | F1 | 0.6 | G1 | 9.0 |
| 58 | Example | A1 | 4.0 | B1 | 16.0 | C1 | 60 | D1 | 1.00 | E1 | 0.40 | F1 | 0.6 | G1 | 9.0 |
| 59 | Example | A1 | 4.0 | B1 | 16.0 | C1 | 60 | D1 | 1.00 | E1 | 0.40 | F1 | 0.6 | G1 | 9.0 |
| 60 | Example | A1 | 4.0 | B1 | 16.0 | C1 | 60 | D1 | 1.00 | E1 | 0.40 | F1 | 0.6 | G1 | 9.0 |
| 61 | Example | A1 | 4.0 | B1 | 16.0 | C1 | 60 | D1 | 1.00 | E1 | 0.40 | F1 | 0.6 | G1 | 9.0 |
| 62 | Example | A4 | 4.0 | B1 | 16.0 | C1 | 60 | D1 | 1.00 | E1 | 0.40 | F1 | 0.6 | G1 | 9.0 |
| 63 | Comparative example | A5 | 4.0 | B1 | 16.0 | C1 | 60 | D1 | 1.00 | E1 | 0.40 | F1 | 0.6 | G1 | 9.0 |
| 64 | Comparative Example | A6 | 4.0 | B1 | 16.0 | C1 | 60 | D1 | 1.00 | E1 | 0.40 | F1 | 0.6 | G1 | 9.0 |
| 65 | Comparative Example | A7 | 4.0 | B1 | 16.0 | C1 | 60 | D1 | 1.00 | E1 | 0.40 | F1 | 0.6 | G1 | 9.0 |
| 66 | Comparative example | A8 | 4.0 | B1 | 16.0 | C1 | 60 | D1 | 1.00 | E1 | 0.40 | F1 | 0.6 | G1 | 9.0 |
| 67 | Comparative example | A9 | 4.0 | B1 | 16.0 | C1 | 60 | D1 | 1.00 | E1 | 0.40 | F1 | 0.6 | G1 | 9.0 |
| 68 | Example | A10 | 4.0 | B1 | 16.0 | C1 | 60 | D1 | 0.94 | E1 | 0.40 | F1 | 0.6 | G1 | 9.0 |
| 69 | Example | A11 | 4.0 | B1 | 16.0 | C1 | 60 | D1 | 1.00 | E1 | 0.40 | F1 | 0.6 | G1 | 9.0 |
| 70 | Example | A12 | 10.0 | B1 | 10.0 | C1 | 60 | D1 | 1.00 | E1 | 0.40 | F1 | 0.6 | G1 | 9.0 |
| 71 | Example | A13 | 4.0 | B1 | 16.0 | C1 | 50 | D1 | 1.00 | E1 | 0.40 | F1 | 0.6 | G1 | 9.0 |
| 72 | Comparative example | A14 | 4.0 | B1 | 16.0 | C1 | 60 | D1 | 1.00 | E1 | 0.40 | F1 | 0.6 | G1 | 9.0 |
| 73 | Comparative example | A15 | 4.0 | B1 | 16.0 | C1 | 60 | D1 | 1.00 | E1 | 0.40 | F1 | 0.6 | G1 | 9.0 |
| 74 | Comparative example | A16 | 4.0 | B1 | 16.0 | C1 | 60 | D1 | 1.00 | E1 | 0.40 | F1 | 0.6 | G1 | 9.0 |
| 75 | Comparative example | A17 | 4.0 | B1 | 16.0 | C1 | 60 | D1 | 1.00 | E1 | 0.40 | F1 | 0.6 | G1 | 9.0 |
| 76 | Comparative example | A18 | 4.0 | B1 | 16.0 | C1 | 60 | D1 | 1.00 | E1 | 0.40 | F1 | 0.6 | G1 | 9.0 |
| 77 | Example | A1 | 4.0 | B2 | 16.0 | C1 | 60 | D1 | 1.00 | E1 | 0.40 | F1 | 0.6 | G1 | 9.0 |
| 78 | Example | A1 | 4.0 | B3 | 16.0 | C1 | 60 | D1 | 1.07 | E1 | 0.40 | F1 | 0.6 | G1 | 9.0 |
| 79 | Comparative example | A1 | 4.0 | B4 | 16.0 | C1 | 60 | D1 | 1.00 | E1 | 0.40 | F1 | 0.6 | G1 | 9.0 |
| 80 | Comparative example | A1 | 4.0 | B5 | 16.0 | C1 | 60 | D1 | 1.00 | E1 | 0.40 | F1 | 0.6 | G1 | 9.0 |
| 81 | Example | A1 | 4.0 | B1 | 16.0 | C4 | 64 | D1 | 1.00 | E1 | 0.40 | F1 | 0.6 | G1 | 9.0 |

TABLE 9-1-continued

| | | (A) | | (B) | | (C) | | (D) Ti | | (E) V | | (F) Mo | | (G) F | |
|---|---|---|---|---|---|---|---|---|---|---|---|---|---|---|---|
| No. | Classification | Type Table 1 | Solid content mass % | Type Table 2 | Solid content mass % | Type Table 3 | Solid content mass % | Type Table 4 | equivalent mass % | Type Table 5 | equivalent mass % | Type Table 6 | equivalent mass % | Type Table 7 | equivalent mass % |
| 82 | Comparative Example | A1 | 4.0 | B1 | 16.0 | C5 | 60 | D1 | 1.00 | E1 | 0.40 | F1 | 0.6 | G1 | 9.0 |
| 83 | Example | A1 | 4.0 | B1 | 16.0 | C1 | 60 | D1 | 1.00 | E1 | 0.40 | F2 | 0.6 | G4 | 9.0 |
| 84 | Example | A1 | 4.0 | B1 | 16.0 | C1 | 60 | D1 | 1.00 | E1 | 0.40 | F2 | 0.6 | G4 | 9.0 |
| 85 | Example | A1 | 4.0 | B1 | 16.0 | C1 | 60 | D1 | 1.00 | E1 | 0.40 | F2 | 0.6 | G4 | 9.0 |
| 86 | Example | A1 | 4.0 | B1 | 16.0 | C1 | 60 | D1 | 1.00 | E1 | 0.40 | F2 | 0.6 | G4 | 9.0 |
| 87 | Example | A1 | 4.0 | B1 | 16.0 | C1 | 60 | D1 | 1.00 | E3 | 0.40 | F2 | 0.6 | G4 | 9.0 |
| 88 | Example | A1 | 4.0 | B1 | 16.0 | C1 | 60 | D1 | 1.00 | E1 | 0.40 | F3 | 0.6 | G4 | 9.0 |
| 89 | Example | A1 | 4.0 | B1 | 16.0 | C1 | 60 | D1 | 1.00 | E1 | 0.40 | F2 | 0.6 | G4 | 9.0 |
| 90 | Example | A1 | 4.0 | B1 | 16.0 | C1 | 60 | D1 | 1.00 | E1 | 0.40 | F2 | 0.6 | G4 | 9.0 |
| 91 | Example | A1 | 4.0 | B1 | 16.0 | C1 | 60 | D1 | 1.00 | E1 | 0.40 | F2 | 0.6 | G4 | 9.0 |
| 92 | Example | A1 | 4.0 | B1 | 16.0 | C1 | 60 | D1 | 1.00 | E1 | 0.40 | F2 | 0.6 | G4 | 9.0 |
| 93 | Example | A1 | 4.0 | B1 | 16.0 | C1 | 60 | D1 | 1.00 | E1 | 0.40 | F2 | 0.6 | G4 | 9.0 |
| 94 | Example | A1 | 4.0 | B1 | 16.0 | C1 | 60 | D1 | 1.00 | E1 | 0.40 | F2 | 0.6 | G4 | 9.0 |
| 95 | Example | A1 | 4.0 | B1 | 16.0 | C1 | 60 | D1 | 1.00 | E1 | 0.40 | F2 | 0.6 | G4 | 9.0 |
| 96 | Example | A1 | 4.0 | B1 | 16.0 | C1 | 60 | D1 | 1.00 | E1 | 0.40 | F2 | 1.6 | G4 | 9.0 |

TABLE 9-2

| | | | Mass ratio of surface treatment solution | | | | | |
|---|---|---|---|---|---|---|---|---|
| No. | Classification | pH | (X1) | (X2) | (X3) | (X4) | (X5) | (X6) |
| 1 | Example | 4.5 | 0.20 | 0.75 | 60 | 0.40 | 0.008 | 0.113 |
| 2 | Example | 4.5 | 0.13 | 0.75 | 60 | 0.40 | 0.008 | 0.113 |
| 3 | Example | 4.5 | 0.11 | 0.75 | 60 | 0.40 | 0.008 | 0.113 |
| 4 | Comparative Example | 4.5 | 0.08 | 0.75 | 60 | 0.40 | 0.008 | 0.113 |
| 5 | Example | 4.5 | 0.27 | 0.73 | 58 | 0.40 | 0.008 | 0.113 |
| 6 | Example | 4.5 | 0.29 | 0.70 | 56 | 0.40 | 0.008 | 0.113 |
| 7 | Comparative example | 4.5 | 0.32 | 0.68 | 55 | 0.40 | 0.007 | 0.111 |
| 8 | Comparative example | 4.5 | 0.20 | 0.75 | 60 | 0.40 | 0.008 | 0.113 |
| 9 | Comparative example | 4.5 | 0.20 | 0.75 | 60 | 0.40 | 0.008 | 0.113 |
| 10 | Comparative example | 4.5 | 0.20 | 0.75 | 60 | 0.00 | 0.008 | 0.113 |
| 11 | Comparative example | 4.5 | 0.20 | 0.75 | 60 | 0.40 | 0.008 | 0.113 |
| 12 | Example | 4.5 | 0.20 | 0.75 | 60 | 0.40 | 0.008 | 0.113 |
| 13 | Example | 4.5 | 0.20 | 0.75 | 60 | 0.40 | 0.008 | 0.113 |
| 14 | Example | 4.5 | 0.20 | 0.75 | 60 | 0.40 | 0.008 | 0.113 |
| 15 | Example | 4.5 | 0.20 | 0.75 | 60 | 0.40 | 0.008 | 0.113 |
| 16 | Comparative Example | 4.5 | 0.23 | 0.54 | 60 | 0.40 | 0.007 | 0.108 |
| 17 | Example | 4.5 | 0.23 | 0.63 | 61 | 0.40 | 0.007 | 0.108 |
| 18 | Example | 4.5 | 0.13 | 0.82 | 62 | 0.40 | 0.007 | 0.108 |
| 19 | Comparative example | 4.5 | 0.12 | 0.87 | 60 | 0.40 | 0.007 | 0.108 |
| 20 | Comparative example | 4.5 | 0.20 | 0.75 | 75 | 0.40 | 0.008 | 0.113 |
| 21 | Example | 4.5 | 0.20 | 0.75 | 68 | 0.40 | 0.008 | 0.113 |
| 22 | Example | 4.5 | 0.20 | 0.75 | 52 | 0.40 | 0.008 | 0.113 |
| 23 | Comparative example | 4.5 | 0.20 | 0.75 | 48 | 0.40 | 0.008 | 0.113 |
| 24 | Comparative example | 4.5 | 0.20 | 0.75 | 60 | 0.24 | 0.008 | 0.113 |
| 25 | Example | 4.5 | 0.20 | 0.75 | 60 | 0.33 | 0.008 | 0.113 |
| 26 | Example | 4.5 | 0.20 | 0.75 | 60 | 0.49 | 0.008 | 0.113 |
| 27 | Comparative Example | 4.5 | 0.20 | 0.75 | 60 | 0.55 | 0.008 | 0.113 |
| 28 | Example | 4.5 | 0.20 | 0.75 | 60 | 0.40 | 0.004 | 0.113 |
| 29 | Comparative example | 4.5 | 0.20 | 0.75 | 60 | 0.40 | 0.001 | 0.113 |
| 30 | Comparative example | 4.5 | 0.20 | 0.75 | 60 | 0.40 | 0.000 | 0.113 |
| 31 | Comparative example | 4.5 | 0.20 | 0.75 | 60 | 0.40 | 0.033 | 0.113 |
| 32 | Example | 4.5 | 0.20 | 0.75 | 60 | 0.40 | 0.008 | 0.113 |
| 33 | Example | 4.5 | 0.20 | 0.75 | 60 | 0.40 | 0.008 | 0.105 |
| 34 | Example | 4.5 | 0.20 | 0.75 | 60 | 0.40 | 0.008 | 0.103 |
| 35 | Example | 4.5 | 0.20 | 0.75 | 60 | 0.40 | 0.008 | 0.101 |
| 36 | Comparative Example | 4.5 | 0.20 | 0.75 | 60 | 0.40 | 0.008 | 0.075 |
| 37 | Example | 4.5 | 0.20 | 0.75 | 60 | 0.40 | 0.008 | 0.175 |
| 38 | Comparative Example | 4.5 | 0.20 | 0.75 | 60 | 0.40 | 0.008 | 0.213 |
| 39 | Example | 4.5 | 0.20 | 0.75 | 60 | 0.40 | 0.008 | 0.113 |
| 40 | Example | 4.5 | 0.20 | 0.75 | 60 | 0.40 | 0.008 | 0.113 |
| 41 | Example | 4.5 | 0.20 | 0.75 | 60 | 0.40 | 0.008 | 0.113 |
| 42 | Example | 4.5 | 0.20 | 0.75 | 60 | 0.40 | 0.008 | 0.113 |
| 43 | Comparative example | 3.0 | 0.20 | 0.75 | 60 | 0.40 | 0.008 | 0.113 |
| 44 | Comparative example | 3.4 | 0.20 | 0.75 | 60 | 0.40 | 0.008 | 0.113 |
| 45 | Example | 4.0 | 0.20 | 0.75 | 60 | 0.40 | 0.008 | 0.113 |
| 46 | Example | 5.0 | 0.20 | 0.75 | 60 | 0.40 | 0.008 | 0.113 |
| 47 | Comparative example | 5.5 | 0.20 | 0.75 | 60 | 0.40 | 0.008 | 0.113 |
| 48 | Comparative example | 6.0 | 0.20 | 0.75 | 60 | 0.40 | 0.008 | 0.113 |
| 49 | Comparative example | 4.5 | 0.20 | 0.75 | 60 | 0.40 | 0.008 | 0.113 |
| 50 | Example | 4.5 | 0.20 | 0.75 | 60 | 0.40 | 0.008 | 0.113 |
| 51 | Example | 4.5 | 0.20 | 0.75 | 60 | 0.40 | 0.008 | 0.113 |
| 52 | Example | 4.5 | 0.20 | 0.75 | 60 | 0.40 | 0.008 | 0.113 |
| 53 | Example | 4.5 | 0.20 | 0.75 | 60 | 0.40 | 0.008 | 0.113 |
| 54 | Example | 4.5 | 0.20 | 0.75 | 60 | 0.40 | 0.008 | 0.113 |
| 55 | Comparative Example | 4.5 | 0.20 | 0.75 | 60 | 0.40 | 0.008 | 0.113 |
| 56 | Example | 4.5 | 0.20 | 0.75 | 60 | 0.40 | 0.008 | 0.113 |
| 57 | Example | 4.5 | 0.20 | 0.75 | 60 | 0.40 | 0.008 | 0.113 |
| 58 | Example | 4.5 | 0.20 | 0.75 | 60 | 0.40 | 0.008 | 0.113 |
| 59 | Example | 4.5 | 0.20 | 0.75 | 60 | 0.40 | 0.008 | 0.113 |
| 60 | Example | 4.5 | 0.20 | 0.75 | 60 | 0.40 | 0.008 | 0.113 |
| 61 | Example | 4.5 | 0.20 | 0.75 | 60 | 0.40 | 0.008 | 0.113 |
| 62 | Example | 4.5 | 0.20 | 0.75 | 60 | 0.40 | 0.008 | 0.113 |
| 63 | Comparative example | 4.5 | 0.20 | 0.75 | 60 | 0.40 | 0.008 | 0.113 |
| 64 | Comparative Example | 4.5 | 0.20 | 0.75 | 60 | 0.40 | 0.008 | 0.113 |
| 65 | Comparative Example | 4.5 | 0.20 | 0.75 | 60 | 0.40 | 0.008 | 0.113 |

TABLE 9-2-continued

| No. | Classification | pH | (X1) | (X2) | (X3) | (X4) | (X5) | (X6) |
|---|---|---|---|---|---|---|---|---|
| 66 | Comparative example | 4.5 | 0.20 | 0.75 | 60 | 0.40 | 0.008 | 0.113 |
| 67 | Comparative example | 4.5 | 0.20 | 0.75 | 60 | 0.40 | 0.008 | 0.113 |
| 68 | Example | 4.5 | 0.20 | 0.75 | 64 | 0.43 | 0.008 | 0.113 |
| 69 | Example | 4.5 | 0.20 | 0.75 | 60 | 0.40 | 0.008 | 0.113 |
| 70 | Example | 4.5 | 0.13 | 0.75 | 60 | 0.40 | 0.008 | 0.113 |
| 71 | Example | 4.5 | 0.23 | 0.71 | 50 | 0.40 | 0.009 | 0.129 |
| 72 | Comparative example | 4.5 | 0.20 | 0.75 | 60 | 0.40 | 0.008 | 0.113 |
| 73 | Comparative example | 4.5 | 0.20 | 0.75 | 60 | 0.40 | 0.008 | 0.113 |
| 74 | Comparative example | 4.5 | 0.20 | 0.75 | 60 | 0.40 | 0.008 | 0.113 |
| 75 | Comparative example | 4.5 | 0.20 | 0.75 | 60 | 0.40 | 0.008 | 0.113 |
| 76 | Comparative example | 4.5 | 0.20 | 0.75 | 60 | 0.40 | 0.008 | 0.113 |
| 77 | Example | 4.5 | 0.20 | 0.75 | 60 | 0.40 | 0.008 | 0.113 |
| 78 | Example | 4.5 | 0.20 | 0.75 | 56 | 0.37 | 0.008 | 0.113 |
| 79 | Comparative example | 4.5 | 0.20 | 0.75 | 60 | 0.40 | 0.008 | 0.113 |
| 80 | Comparative example | 4.5 | 0.20 | 0.75 | 60 | 0.40 | 0.008 | 0.113 |
| 81 | Example | 4.5 | 0.19 | 0.76 | 64 | 0.40 | 0.007 | 0.107 |
| 82 | Comparative Example | 4.5 | 0.20 | 0.75 | 60 | 0.40 | 0.008 | 0.113 |
| 83 | Example | 4.5 | 0.20 | 0.75 | 60 | 0.40 | 0.008 | 0.113 |
| 84 | Example | 4.5 | 0.20 | 0.75 | 60 | 0.40 | 0.008 | 0.113 |
| 85 | Example | 4.5 | 0.20 | 0.75 | 60 | 0.40 | 0.008 | 0.113 |
| 86 | Example | 4.5 | 0.20 | 0.75 | 60 | 0.40 | 0.008 | 0.113 |
| 87 | Example | 4.5 | 0.20 | 0.75 | 60 | 0.40 | 0.008 | 0.113 |
| 88 | Example | 4.5 | 0.20 | 0.75 | 60 | 0.40 | 0.008 | 0.113 |
| 89 | Example | 4.5 | 0.20 | 0.75 | 60 | 0.40 | 0.008 | 0.113 |
| 90 | Example | 4.5 | 0.20 | 0.75 | 60 | 0.40 | 0.008 | 0.113 |
| 91 | Example | 4.5 | 0.20 | 0.75 | 60 | 0.40 | 0.008 | 0.113 |
| 92 | Example | 4.5 | 0.20 | 0.75 | 60 | 0.40 | 0.008 | 0.113 |
| 93 | Example | 4.5 | 0.20 | 0.75 | 60 | 0.40 | 0.008 | 0.113 |
| 94 | Example | 4.5 | 0.20 | 0.75 | 60 | 0.40 | 0.008 | 0.113 |
| 95 | Example | 4.5 | 0.20 | 0.75 | 60 | 0.40 | 0.008 | 0.113 |
| 96 | Example | 4.5 | 0.20 | 0.75 | 60 | 0.40 | 0.008 | 0.113 |

TABLE 10

| No. | Classification | Coated steel sheet Table 8 | PMT °C. | Coating weight g/m² | Solid concentration % | Organic resin film/Paint Table 11 | Remarks |
|---|---|---|---|---|---|---|---|
| 1 | Example | Z1 | 100 | 0.03 | 0.3 | R1 | |
| 2 | Example | Z1 | 100 | 0.03 | 0.3 | R1 | |
| 3 | Example | Z1 | 100 | 0.03 | 0.3 | R1 | |
| 4 | Comparative Example | Z1 | 100 | 0.03 | 0.3 | R1 | |
| 5 | Example | Z1 | 100 | 0.03 | 0.3 | R1 | |
| 6 | Example | Z1 | 100 | 0.03 | 0.3 | R1 | |
| 7 | Comparative example | Z1 | 100 | 0.03 | 0.3 | R1 | |
| 8 | Comparative example | Z1 | 100 | 0.03 | 0.3 | R1 | |
| 9 | Comparative example | Z1 | 100 | 0.03 | 0.3 | R1 | |
| 10 | Comparative example | Z1 | 100 | 0.03 | 0.3 | R1 | |
| 11 | Comparative example | Z1 | 100 | 0.03 | 0.3 | R1 | |
| 12 | Example | Z1 | 100 | 0.03 | 0.3 | R1 | |
| 13 | Example | Z1 | 100 | 0.03 | 0.3 | R1 | |
| 14 | Example | Z1 | 100 | 0.03 | 0.3 | R1 | |
| 15 | Example | Z1 | 100 | 0.03 | 0.3 | R1 | |
| 16 | Comparative Example | Z1 | 100 | 0.03 | 0.3 | R1 | |
| 17 | Example | Z1 | 100 | 0.03 | 0.3 | R1 | |
| 18 | Example | Z1 | 100 | 0.03 | 0.3 | R1 | |
| 19 | Comparative example | Z1 | 100 | 0.03 | 0.3 | R1 | |
| 20 | Comparative example | Z1 | 100 | 0.03 | 0.3 | R1 | |
| 21 | Example | Z1 | 100 | 0.03 | 0.3 | R1 | |
| 22 | Example | Z1 | 100 | 0.03 | 0.3 | R1 | |
| 23 | Comparative example | Z1 | 100 | 0.03 | 0.3 | R1 | |
| 24 | Comparative example | Z1 | 100 | 0.03 | 0.3 | R1 | |
| 25 | Example | Z1 | 100 | 0.03 | 0.3 | R1 | |
| 26 | Example | Z1 | 100 | 0.03 | 0.3 | R1 | |
| 27 | Comparative Example | Z1 | 100 | 0.03 | 0.3 | R1 | |
| 28 | Example | Z1 | 100 | 0.03 | 0.3 | R1 | |
| 29 | Comparative example | Z1 | 100 | 0.03 | 0.3 | R1 | |
| 30 | Comparative example | Z1 | 100 | 0.03 | 0.3 | R1 | |
| 31 | Comparative example | Z1 | 100 | 0.03 | 0.3 | R1 | |
| 32 | Example | Z1 | 100 | 0.03 | 0.3 | R1 | |
| 33 | Example | Z1 | 100 | 0.03 | 0.3 | R1 | |
| 34 | Example | Z1 | 100 | 0.03 | 0.3 | R1 | |
| 35 | Example | Z1 | 100 | 0.03 | 0.3 | R1 | |
| 36 | Comparative Example | Z1 | 100 | 0.03 | 0.3 | R1 | Composition shown in an example of PTL 1. |
| 37 | Example | Z1 | 100 | 0.03 | 0.3 | R1 | |
| 38 | Comparative Example | Z1 | 100 | 0.03 | 0. | R1 | |
| 39 | Example | Z1 | 100 | 0.03 | 0.3 | R1 | |
| 40 | Example | Z1 | 100 | 0.03 | 0.3 | R1 | |
| 41 | Example | Z1 | 100 | 0.03 | 0.3 | R1 | |
| 42 | Example | Z1 | 100 | 0.03 | 0.3 | R1 | |
| 43 | Comparative example | Z1 | 100 | 0.03 | 0.3 | R1 | |
| 44 | Comparative example | Z1 | 100 | 0.03 | 0.3 | R1 | |
| 45 | Example | Z1 | 100 | 0.03 | 0.3 | R1 | |

TABLE 10-continued

| No. | Classification | Coated steel sheet Table 8 | PMT °C. | Coating weight g/m² | Solid concentration % | Organic resin film/Paint Table 11 | Remarks |
|---|---|---|---|---|---|---|---|
| 46 | Example | Z1 | 100 | 0.03 | 0.3 | R1 | |
| 47 | Comparative example | Z1 | 100 | 0.03 | 0.3 | R1 | |
| 48 | Comparative example | Z1 | — | — | — | R1 | Test discontinued due to gelling of surface treatment solution. |
| 49 | Comparative example | Z1 | 100 | 0.003 | 0.03 | R1 | |
| 50 | Example | Z1 | 100 | 0.008 | 0.08 | R1 | |
| 51 | Example | Z1 | 100 | 0.01 | 0.2 | R1 | |
| 52 | Example | Z1 | 100 | 0.10 | 0.2 | R1 | |
| 53 | Example | Z1 | 100 | 0.14 | 1.5 | R1 | |
| 54 | Example | Z1 | 100 | 0.18 | 1.8 | R1 | |
| 55 | Comparative Example | Z1 | 100 | 0.23 | 2.3 | R1 | |
| 56 | Example | Z1 | 40 | 0.03 | 0.3 | R1 | |
| 57 | Example | Z1 | 60 | 0.03 | 0.3 | R1 | |
| 58 | Example | Z1 | 70 | 0.03 | 0.3 | R1 | |
| 59 | Example | Z1 | 110 | 0.03 | 0.3 | R1 | |
| 60 | Example | Z1 | 140 | 0.03 | 0.3 | R1 | |
| 61 | Example | Z1 | 220 | 0.03 | 0.3 | R1 | |
| 62 | Example | Z1 | 100 | 0.03 | 0.3 | R1 | |
| 63 | Comparative example | Z1 | — | — | — | R1 | Test discontinued due to the occurrence of undissolved material. |
| 64 | Comparative Example | Z1 | — | — | — | R1 | Test discontinued due to the occurrence of undissolved material. |
| 65 | Comparative Example | Z1 | — | — | — | R1 | Test discontinued due to the occurrence of undissolved material. |
| 66 | Comparative example | Z1 | 100 | 0.03 | 0.3 | R1 | |
| 67 | Comparative example | Z1 | 100 | 0.03 | 0.3 | R1 | |
| 68 | Example | Z1 | 100 | 0.03 | 0.3 | R1 | |
| 69 | Example | Z1 | 100 | 0.03 | 0.3 | R1 | |
| 70 | Example | Z1 | 100 | 0.03 | 0.3 | R1 | |
| 71 | Example | Z1 | 100 | 0.03 | 0.3 | R1 | |
| 72 | Comparative example | Z1 | — | — | — | R1 | Test discontinued due to the occurrence of undissolved material. |
| 73 | Comparative example | Z1 | — | — | — | R1 | Test discontinued due to the occurrence of undissolved material. |
| 74 | Comparative example | Z1 | — | — | — | R1 | Test discontinued due to the occurrence of undissolved material. |
| 75 | Comparative example | Z1 | 100 | 0.03 | 0.3 | R1 | |
| 76 | Comparative example | Z1 | 100 | 0.03 | 0.3 | R1 | |
| 77 | Example | Z1 | 100 | 0.03 | 0.3 | R1 | |
| 78 | Example | Z1 | 100 | 0.03 | 0.3 | R1 | |
| 79 | Comparative example | Z1 | — | — | — | R1 | Test discontinued due to agglomeration of urethane resin. |
| 80 | Comparative example | Z1 | — | — | — | R1 | Test discontinued due to agglomeration of urethane resin. |
| 81 | Example | Z1 | 100 | 0.03 | 0.3 | R1 | |
| 82 | Comparative Example | Z1 | 100 | 0.03 | 0.3 | R1 | |
| 83 | Example | Z2 | 100 | 0.03 | 0.3 | R1 | |
| 84 | Example | Z3 | 100 | 0.03 | 0.3 | R1 | |
| 85 | Example | ZA | 100 | 0.03 | 0.3 | R1 | |
| 86 | Example | Z5 | 100 | 0.03 | 0.3 | R1 | |
| 87 | Example | Z1 | 100 | 0.03 | 0.3 | R1 | |
| 88 | Example | Z1 | 100 | 0.03 | 0.3 | R1 | |
| 89 | Example | Z1 | 100 | 0.03 | 0.05 | R1 | |
| 90 | Example | Z1 | 100 | 0.03 | 1.0 | R1 | |
| 91 | Example | Z1 | 100 | 0.03 | 5. | R1 | |
| 92 | Example | Z1 | 100 | 0.03 | 5.2 | R1 | |
| 93 | Example | Z1 | 100 | 0.03 | 5.2 | R1 | |
| 94 | Example | Z1 | 100 | 0.03 | 0.3 | R2 | |
| 95 | Example | Z1 | 100 | 0.03 | 0.3 | R3 | |
| 96 | Example | Z1 | 100 | 0.03 | 0.3 | R4 | |

TABLE 11

| | Organic Resin Layer | |
|---|---|---|
| No. | Film or paint | Layer thickness |
| R1 | polyvinyl chloride film | 200 μm |
| R2 | polyester-based film | 100 μm |
| R3 | polyolefin-based film | 100 μm |
| R4 | polyolefin-based paint | 60 μm |

TABLE 12

| No. | Classification | (1) Blackening resistance | (2) Corrosion resistance | (3) Adhesion 1 | (4) Adhesion after boiling water 1 | (5) Adhesion 2 | (6) Adhesion after boiling water 2 | (7) Storage stability |
|---|---|---|---|---|---|---|---|---|
| 1 | Example | ⊚ | ⊚ | ⊚ | ⊚ | ⊚ | ⊚ | ⊚ |
| 2 | Example | ⊚ | ⊚ | ⊚ | ⊚ | ⊚ | ⊚ | ⊚ |
| 3 | Example | ⊚ | ⊚ | ⊚ | ⊚ | ○ | △ | ○ |
| 4 | Comparative Example | ⊚ | ⊚ | ○ | ○ | △ | X | X |
| 5 | Example | ⊚ | ⊚ | ⊚ | ⊚ | ⊚ | ○ | ⊚ |
| 6 | Example | ⊚ | ⊚ | ⊚ | ○ | ○ | △ | ⊚ |
| 7 | Comparative example | ⊚ | ⊚ | ○ | △ | △ | X | ⊚ |
| 8 | Comparative example | ⊚ | X | ⊚ | ⊚ | ⊚ | ⊚ | ⊚ |
| 9 | Comparative example | ⊚ | X | ⊚ | ⊚ | ○ | ⊚ | ⊚ |
| 10 | Comparative example | ⊚ | X | ⊚ | ⊚ | ⊚ | ⊚ | ⊚ |
| 11 | Comparative example | ⊚ | ○ | ⊚ | △ | ○ | X | △ |
| 12 | Example | ⊚ | ⊚ | ⊚ | ⊚ | ⊚ | ⊚ | ⊚ |
| 13 | Example | ⊚ | ⊚ | ⊚ | ⊚ | ⊚ | ⊚ | ⊚ |
| 14 | Example | ⊚ | ⊚ | ⊚ | ⊚ | ⊚ | ⊚ | ⊚ |
| 15 | Example | ⊚ | ⊚ | ⊚ | ⊚ | ⊚ | ⊚ | ⊚ |
| 16 | Comparative Example | ⊚ | ○ | ⊚ | △ | ○ | X | ⊚ |
| 17 | Example | ⊚ | ⊚ | ⊚ | ○ | ⊚ | △ | ⊚ |
| 18 | Example | ⊚ | ⊚ | ⊚ | ⊚ | ⊚ | ⊚ | △ |
| 19 | Comparative example | ⊚ | ⊚ | ⊚ | ⊚ | ⊚ | ⊚ | X |
| 20 | Comparative example | ⊚ | ○ | ⊚ | ○ | ○ | X | ⊚ |
| 21 | Example | ⊚ | ○ | ⊚ | ⊚ | ○ | △ | ⊚ |
| 22 | Example | ⊚ | △ | ⊚ | ○ | ○ | △ | ⊚ |
| 23 | Comparative example | ⊚ | X | ○ | △ | △ | X | ⊚ |
| 24 | Comparative example | ⊚ | X | ⊚ | ⊚ | ⊚ | ⊚ | ⊚ |
| 25 | Example | ⊚ | △ | ⊚ | ⊚ | ⊚ | ⊚ | ⊚ |
| 26 | Example | ⊚ | ○ | ⊚ | ○ | ⊚ | △ | ⊚ |
| 27 | Comparative Example | ⊚ | ○ | ⊚ | △ | ⊚ | X | ⊚ |
| 28 | Example | △ | ⊚ | ⊚ | ⊚ | ⊚ | ⊚ | ⊚ |
| 29 | Comparative example | X | ⊚ | ⊚ | ⊚ | ⊚ | ⊚ | ⊚ |
| 30 | Comparative example | X | ⊚ | ⊚ | ⊚ | ⊚ | ⊚ | ⊚ |
| 31 | Comparative example | ⊚ | ⊚ | ⊚ | ⊚ | ⊚ | ⊚ | X |
| 32 | Example | ⊚ | ⊚ | ⊚ | ⊚ | ⊚ | ⊚ | ⊚ |
| 33 | Example | ⊚ | ⊚ | ⊚ | ⊚ | ⊚ | ⊚ | ⊚ |
| 34 | Example | ⊚ | ⊚ | ⊚ | ⊚ | ⊚ | ○ | ⊚ |
| 35 | Example | ⊚ | ⊚ | ⊚ | ⊚ | ○ | △ | ⊚ |
| 36 | Comparative Example | ⊚ | ⊚ | ⊚ | ○ | △ | X | ⊚ |
| 37 | Example | ⊚ | ⊚ | ⊚ | ○ | ⊚ | ○ | ⊚ |
| 38 | Comparative Example | ⊚ | X | ⊚ | △ | ○ | X | ⊚ |
| 39 | Example | ⊚ | ⊚ | ⊚ | ⊚ | ⊚ | ⊚ | ⊚ |
| 40 | Example | ⊚ | ⊚ | ⊚ | ⊚ | ⊚ | ⊚ | ⊚ |
| 41 | Example | ⊚ | ⊚ | ⊚ | ⊚ | ⊚ | ⊚ | ⊚ |
| 42 | Example | ⊚ | ⊚ | ⊚ | ⊚ | ⊚ | ⊚ | ⊚ |
| 43 | Comparative example | ⊚ | X | ⊚ | ⊚ | ○ | △ | ⊚ |
| 44 | Comparative example | ⊚ | X | ⊚ | ⊚ | ⊚ | ○ | ⊚ |
| 45 | Example | ⊚ | ⊚ | ⊚ | ⊚ | ⊚ | ⊚ | ⊚ |
| 46 | Example | ⊚ | ⊚ | ⊚ | ⊚ | ⊚ | ⊚ | ⊚ |
| 47 | Comparative example | ⊚ | ⊚ | ⊚ | ⊚ | ⊚ | ⊚ | X |
| 48 | Comparative example | Test discontinued due to gelling of surface treatment solution. | | | | | | |
| 49 | Comparative example | △ | X | ○ | △ | △ | X | ⊚ |
| 50 | Example | ○ | △ | ⊚ | ⊚ | ○ | △ | ⊚ |
| 51 | Example | ⊚ | ○ | ⊚ | ⊚ | ⊚ | ○ | ⊚ |
| 52 | Example | ⊚ | ⊚ | ⊚ | ⊚ | ⊚ | ⊚ | ⊚ |

TABLE 12-continued

| | | Performance evaluation | | | | | | |
|---|---|---|---|---|---|---|---|---|
| | | (1) Blackening | (2) Corrosion | (3) | (4) Adhesion after | (5) | (6) Adhesion after | (7) Storage |
| No. | Classification | resistance | resistance | Adhesion 1 | boiling water 1 | Adhesion 2 | boiling water 2 | stability |
| 53 | Example | ⊚ | ⊚ | ⊚ | ⊚ | ⊚ | ○ | ⊚ |
| 54 | Example | ⊚ | ⊚ | ⊚ | ○ | ○ | △ | ⊚ |
| 55 | Comparative Example | ⊚ | ⊚ | ○ | △ | △ | X | ⊚ |
| 56 | Example | ⊚ | ⊚ | ⊚ | ○ | ○ | △ | ⊚ |
| 57 | Example | ⊚ | ⊚ | ⊚ | ⊚ | ⊚ | ○ | ⊚ |
| 58 | Example | ⊚ | ⊚ | ⊚ | ⊚ | ⊚ | ⊚ | ⊚ |
| 59 | Example | ⊚ | ⊚ | ⊚ | ⊚ | ⊚ | ⊚ | ⊚ |
| 60 | Example | ⊚ | ⊚ | ⊚ | ⊚ | ⊚ | ○ | ⊚ |
| 61 | Example | ⊚ | △ | ○ | ○ | △ | △ | ⊚ |
| 62 | Example | ⊚ | ⊚ | ⊚ | ⊚ | ⊚ | ⊚ | ⊚ |
| 63 | Comparative example | Test discontinued due to the occurrence of undissolved material. | | | | | | |
| 64 | Comparative Example | Test discontinued due to the occurrence of undissolved material. | | | | | | |
| 65 | Comparative Example | Test discontinued due to the occurrence of undissolved material. | | | | | | |
| 66 | Comparative example | ○ | X | ○ | △ | △ | X | ⊚ |
| 67 | Comparative example | ○ | ⊚ | ⊚ | ⊚ | ⊚ | ⊚ | X |
| 68 | Example | ⊚ | ⊚ | ⊚ | ⊚ | ⊚ | ⊚ | ⊚ |
| 69 | Example | ○ | ⊚ | ⊚ | ⊚ | ⊚ | ⊚ | ⊚ |
| 70 | Example | ⊚ | ⊚ | ⊚ | ⊚ | ⊚ | ○ | ⊚ |
| 71 | Example | ⊚ | ⊚ | ⊚ | ⊚ | ⊚ | ⊚ | ⊚ |
| 72 | Comparative example | Test discontinued due to the occurrence of undissolved material. | | | | | | |
| 73 | Comparative example | Test discontinued due to the occurrence of undissolved material. | | | | | | |
| 74 | Comparative example | Test discontinued due to the occurrence of undissolved material. | | | | | | |
| 75 | Comparative example | ○ | X | ⊚ | △ | △ | X | ⊚ |
| 76 | Comparative example | ○ | ⊚ | ⊚ | ⊚ | ⊚ | ⊚ | X |
| 77 | Example | ⊚ | ⊚ | ⊚ | ⊚ | ⊚ | ⊚ | ⊚ |
| 78 | Example | ⊚ | ⊚ | ⊚ | ⊚ | ⊚ | ○ | ⊚ |
| 79 | Comparative example | Test discontinued due to agglomeration of urethane resin. | | | | | | |
| 80 | Comparative example | Test discontinued due to agglomeration of urethane resin. | | | | | | |
| 81 | Example | ⊚ | ⊚ | ⊚ | ⊚ | ⊚ | ⊚ | ⊚ |
| 82 | Comparative Example | ○ | △ | ○ | △ | △ | X | ⊚ |
| 83 | Example | ⊚ | ⊚ | ⊚ | ⊚ | ⊚ | ⊚ | ⊚ |
| 84 | Example | ⊚ | ⊚ | ⊚ | ⊚ | ⊚ | ⊚ | ⊚ |
| 85 | Example | ⊚ | ⊚ | ⊚ | ⊚ | ⊚ | ⊚ | ⊚ |
| 86 | Example | ⊚ | ⊚ | ⊚ | ⊚ | ⊚ | ⊚ | ⊚ |
| 87 | Example | ⊚ | ⊚ | ⊚ | ⊚ | ⊚ | ⊚ | ⊚ |
| 88 | Example | ⊚ | ⊚ | ⊚ | ⊚ | ⊚ | ⊚ | ⊚ |
| 89 | Example | ⊚ | ⊚ | ⊚ | ⊚ | ⊚ | ⊚ | ⊚ |
| 90 | Example | ⊚ | ⊚ | ⊚ | ⊚ | ⊚ | ⊚ | ⊚ |
| 91 | Example | ⊚ | ⊚ | ⊚ | ⊚ | ⊚ | ⊚ | ⊚ |
| 92 | Example | ⊚ | ⊚ | ⊚ | ⊚ | ⊚ | ⊚ | ○ |
| 93 | Example | ⊚ | ⊚ | ⊚ | ⊚ | ⊚ | ⊚ | ○ |
| 94 | Example | ⊚ | ⊚ | ⊚ | ⊚ | ⊚ | ⊚ | ⊚ |
| 95 | Example | ⊚ | ⊚ | ⊚ | ⊚ | ⊚ | ⊚ | ⊚ |
| 96 | Example | ⊚ | ⊚ | ⊚ | ⊚ | ⊚ | ⊚ | ⊚ |

As presented in Table 12, our examples all have excellent blackening resistance, excellent corrosion resistance and adhesion after organic resin coating, and excellent storage stability.

INDUSTRIAL APPLICABILITY

The zinc or zinc alloy coated or plated steel sheet with a surface-treatment layer produced by the method disclosed herein can be widely used in the fields of automobiles, home appliances, building materials, etc.

The invention claimed is:

1. A method of producing a surface-treated steel sheet for organic resin coating, the method comprising:
applying, to a surface of a zinc or zinc alloy coated or plated steel sheet, a surface-treatment solution containing:
a resin compound (A) having a bisphenol skeleton represented by general formula (I) below;
a cationic urethane resin emulsion (B) having at least one cationic functional group selected from the group consisting of primary to tertiary amino groups and a quaternary ammonium base;

a silane coupling agent (C) having at least one reactive functional group selected from the group consisting of an active hydrogen-containing amino group, an epoxy group, a mercapto group, and a methacryloxy group;

an organic titanium chelate compound (D);

a tetravalent vanadium compound (E);

a molybdate compound (F);

a fluorine compound (G) which is at least one selected from the group consisting of fluorosilicic acid, fluoroboric acid, fluorotitanic acid, acid ammonium fluoride, sodium fluoride, and fluorozirconic acid; and water (H), within a range satisfying conditions (1) to (6) below and with a pH of 4 to 5 to form a surface-treatment layer such that a coating weight of the surface-treatment layer per surface is 0.005 g/m² to 0.18 g/m² after drying of the surface-treatment solution, (1) a ratio of a solid mass ($B_S$) of the cationic urethane resin emulsion (B) to a total of a solid mass ($A_S$) of the resin compound (A), the solid mass ($B_S$) of the cationic urethane resin emulsion (B), and a solid mass ($C_S$) of the silane coupling agent (C), represented by $[(B_S)/\{(A_S)+(B_S)+(C_S)\}]$, is from 0.10 to 0.30, (2) a ratio of the solid mass ($C_S$) of the silane coupling agent (C) to a total of the solid mass ($A_S$) of the resin compound (A), the solid mass ($B_S$) of the cationic urethane resin emulsion (B), and the solid mass ($C_S$) of the silane coupling agent (C), represented by $[(C_S)/\{(A_S)+(B_S)+(C_S)\}]$, is from 0.60 to 0.85, (3) a ratio of the solid mass ($C_S$) of the silane coupling agent (C) to a titanium equivalent mass ($D_{Ti}$) of the organic titanium chelate compound (D), represented by $\{(C_S)/(D_{Ti})\}$, is from 50 to 70, (4) a ratio of a vanadium equivalent mass ($E_V$) of the tetravalent vanadium compound (E) to the titanium equivalent mass ($D_{Ti}$) of the organic titanium chelate compound (D), represented by $\{(E_V)/(D_{Ti})\}$, is from 0.30 to 0.50, (5) a ratio of a molybdenum equivalent mass ($F_{Mo}$) of the molybdate compound (F) to a total of the solid mass ($A_S$) of the resin compound (A), the solid mass ($B_S$) of the cationic urethane resin emulsion (B), and the solid mass ($C_S$) of the silane coupling agent (C), represented by $[(F_{Mo})/\{(A_S)+(B_S)+(C_S)\}]$, is from 0.003 to 0.030, and (6) a ratio of a fluorine equivalent mass (GF) of the fluorine compound (G) to a total of the solid mass ($A_S$) of the resin compound (A), the solid mass ($B_S$) of the cationic urethane resin emulsion (B), and the solid mass ($C_S$) of the silane coupling agent (C), represented by $[(G_F)/\{(A_S)+(B_S)+(C_S)\}]$, is from 0.101 to 0.200,

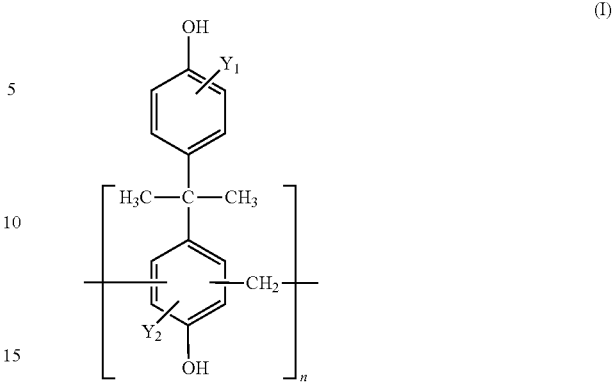

where $Y_1$ and $Y_2$ bonded to benzene rings each independently represent a hydrogen atom or a Z group represented by general formula (II) or (III) below, where an average number of substituent Z groups per benzene ring is from 0.2 to 1.0, and n represents an integer from 2 to 50,

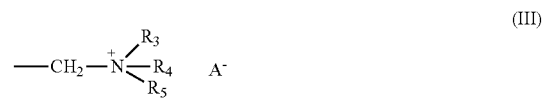

where $R_1$, $R_2$, $R_3$, $R_4$, and $R_5$ each independently represent a hydrogen atom, a $C_1$-$C_{10}$ alkyl group, or a $C_1$-$C_{10}$ hydroxyalkyl group, and A represents a hydroxide ion or an acid ion.

2. The method of producing a surface-treated steel sheet for organic resin coating according to claim 1, wherein the drying of the surface-treatment solution is performed under a condition where a peak metal temperature is from 50° C. to 180° C.

3. The method of producing a surface-treated steel sheet for organic resin coating according to claim 1, wherein the fluorine compound (G) is at least one selected from the group consisting of acid ammonium fluoride and sodium fluoride.

4. The method of producing a surface-treated steel sheet for organic resin coating according to claim 1, wherein the fluorine compound (G) is acid ammonium fluoride.

5. A method of producing an organic resin coated steel sheet, the method comprising:
   the method of producing a surface-treated steel sheet for organic resin coating as recited in claim 1; and
   forming an organic resin layer on the surface-treatment layer of the surface-treated steel sheet for organic resin coating.

6. The method of producing an organic resin coated steel sheet according to claim 5, wherein the organic resin layer is formed by laminating an organic resin film on the surface-treatment layer.

7. The method of producing an organic resin coated steel sheet according to claim 6, wherein the organic resin film has a thickness of 60 μm or more.

8. The method of producing an organic resin coated steel sheet according to claim 6, wherein the organic resin film is at least one film selected from the group consisting of a polyvinyl chloride film, a polyolefin-based film, a polyester-based film, and a fluororesin-based film.

9. The method of producing an organic resin coated steel sheet according to claim 7, wherein the organic resin film is at least one film selected from the group consisting of a polyvinyl chloride film, a polyolefin-based film, a polyester-based film, and a fluororesin-based film.

\* \* \* \* \*